United States Patent [19]

Suzuki et al.

[11] Patent Number: 4,659,201

[45] Date of Patent: Apr. 21, 1987

[54] DRIVE DEVICE FOR CAMERA

[75] Inventors: Masayuki Suzuki, Kanagawa; Tsunemasa Ohara; Yoichi Tosaka, both of Tokyo; Ryuichi Kobayashi, Kanagawa; Yoshihito Harada, Kanagawa; Masaharu Kawamura, Kanagawa, all of Japan

[73] Assignee: Canon Kabushiki Kaisha

[21] Appl. No.: 826,784

[22] Filed: Feb. 6, 1986

[30] Foreign Application Priority Data

| Feb. 10, 1985 | [JP] | Japan | 60-24193 |
| Feb. 10, 1985 | [JP] | Japan | 60-24194 |
| Feb. 10, 1985 | [JP] | Japan | 60-24195 |
| Jul. 9, 1985 | [JP] | Japan | 60-150595 |

[51] Int. Cl.⁴ .......................... G03B 1/00; G03B 9/02; G03B 19/12
[52] U.S. Cl. .................. 354/152; 354/173.1; 354/173.11; 354/213; 354/214
[58] Field of Search ............... 354/412, 173.1, 173.11, 354/213, 214, 152, 270, 271.1

[56] References Cited

U.S. PATENT DOCUMENTS

| 4,015,198 | 3/1977 | Iwashita et al. | 354/412 |
| 4,174,166 | 11/1979 | Daitoku et al. | 354/173.11 |
| 4,383,746 | 5/1983 | Aratarne | 354/173.1 |
| 4,405,221 | 9/1983 | Yoshida et al. | 354/173.1 |
| 4,451,150 | 5/1984 | Maida | 354/173.11 |

FOREIGN PATENT DOCUMENTS

| 117138 | 9/1980 | Japan | 354/173.1 |
| 1134 | 1/1983 | Japan | 354/173.1 |

Primary Examiner—W. B. Perkey
Attorney, Agent, or Firm—Toren, McGeady and Goldberg

[57] ABSTRACT

A drive device for a camera in which the charging of the various portions of the camera and the film transportation are carried out by a plurality of motors individually solely used therefor, whereby control means is provided for controlling the driving of all the motors in such a manner that after the termination of the shutter operation, the initiations of current supply to the plurality of motors are displaced so that the rush currents to these motors are prevented from superimposing one upon another.

22 Claims, 27 Drawing Figures

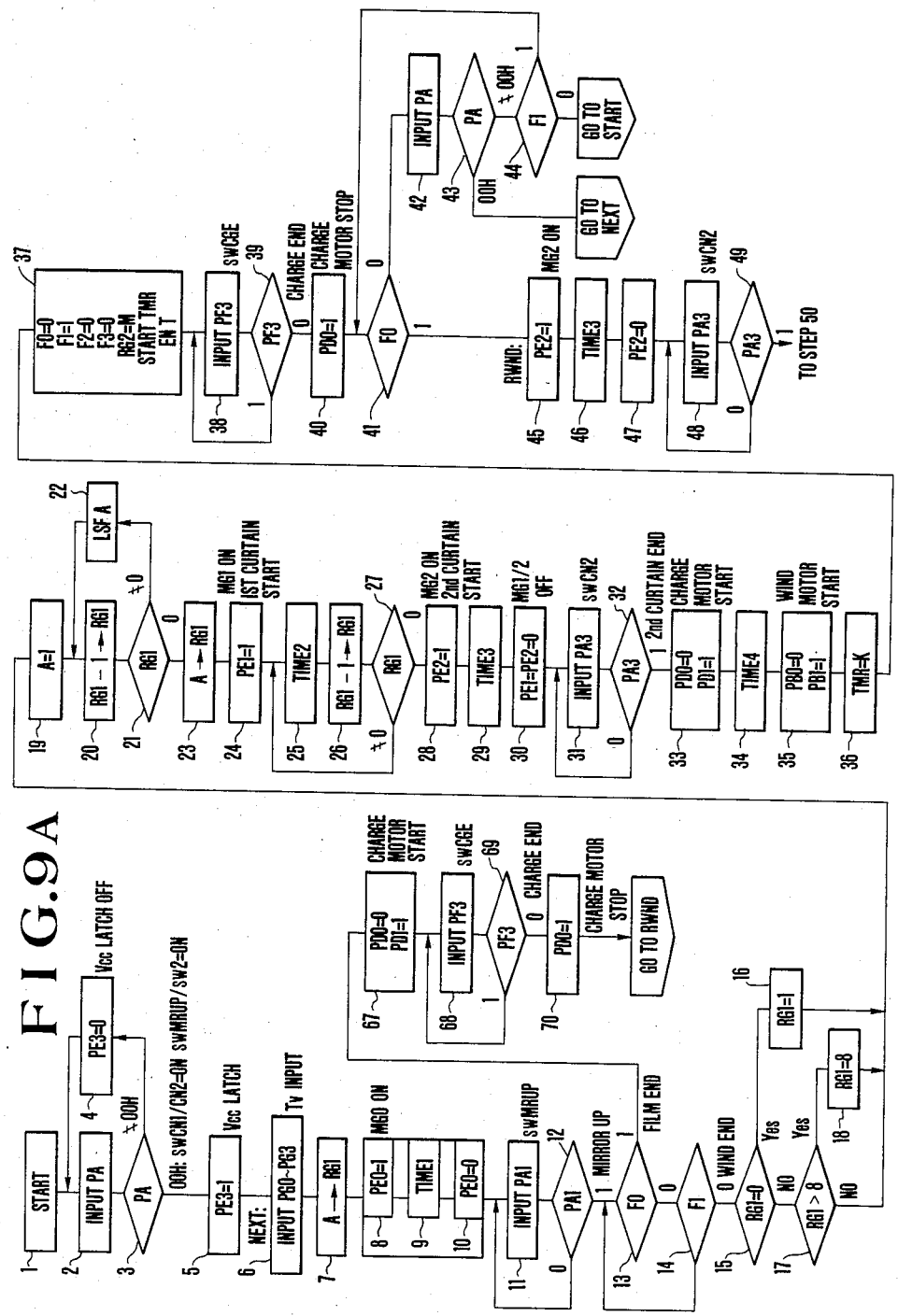

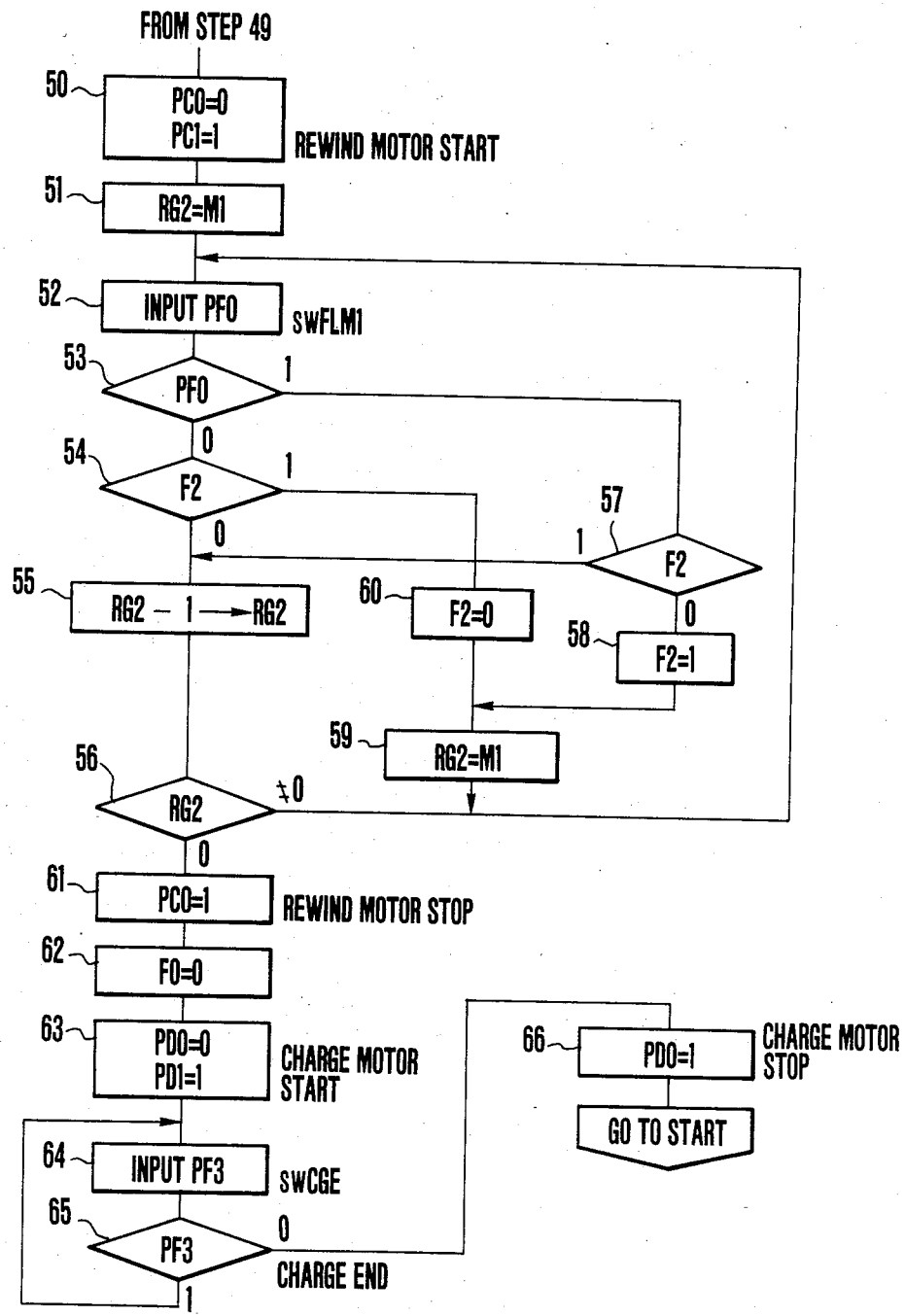

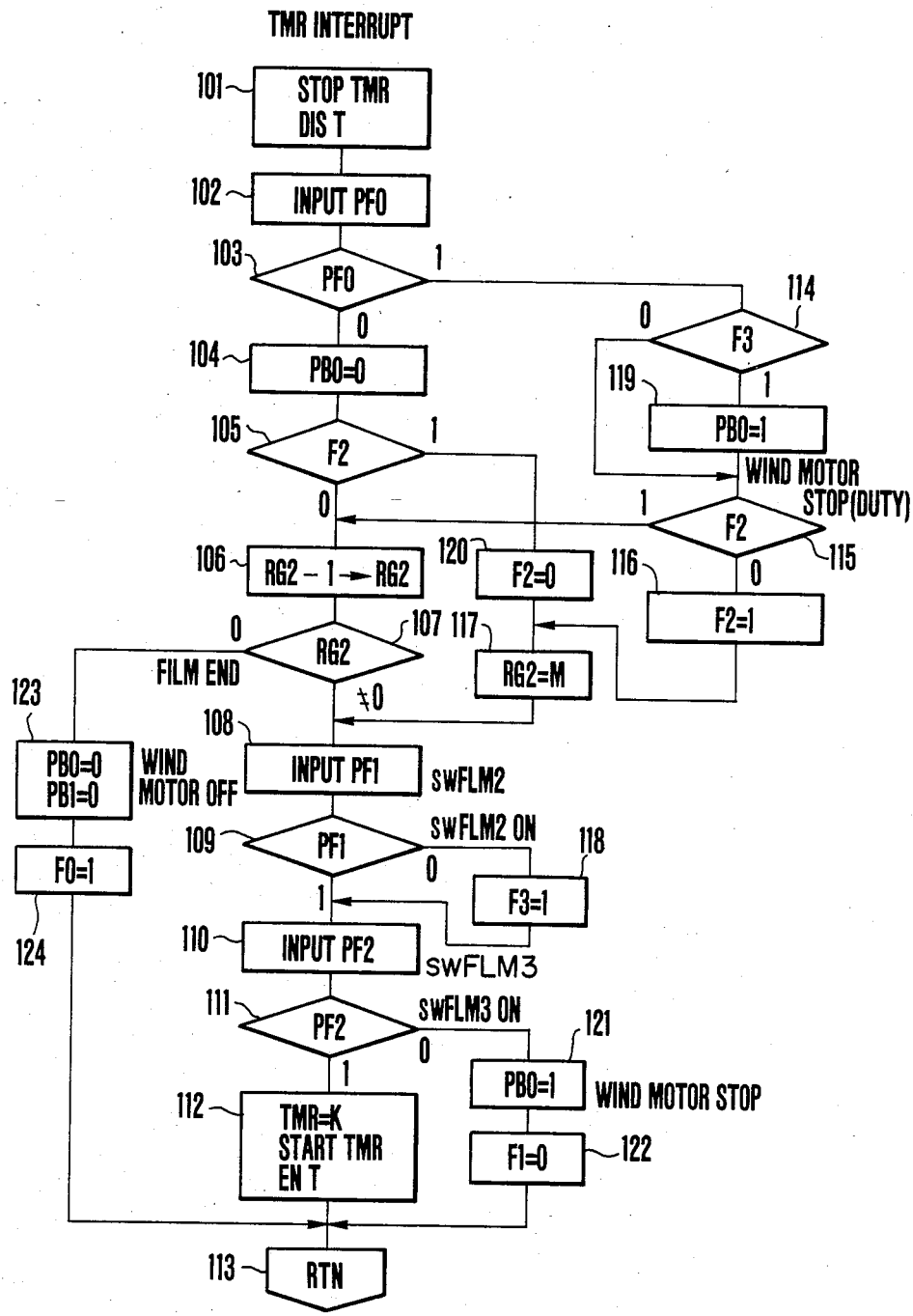

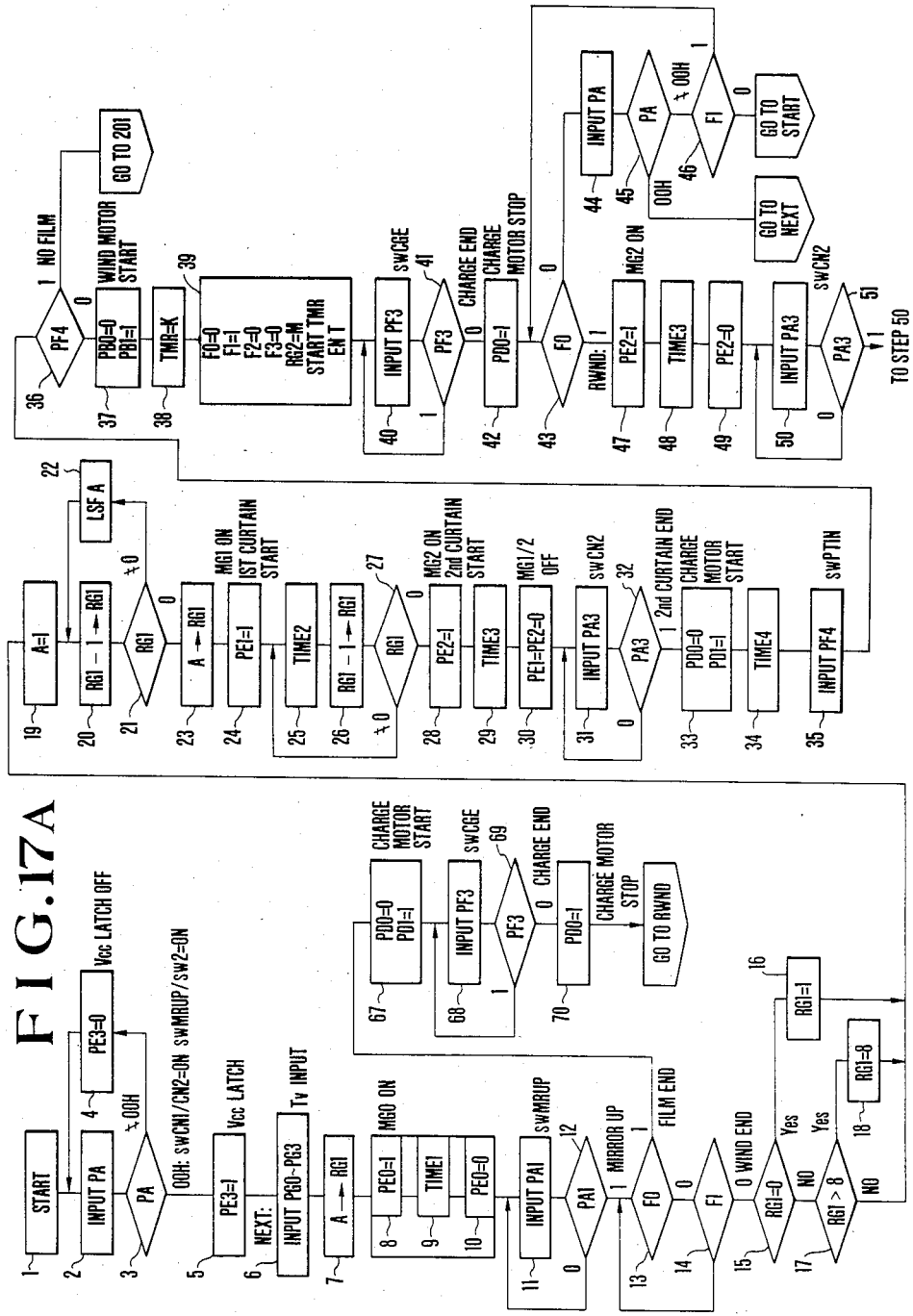

F I G.19
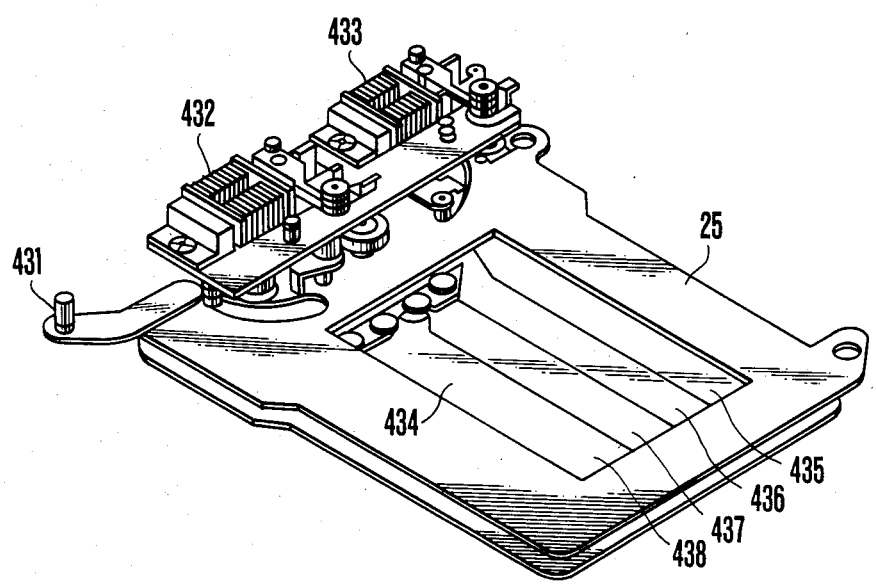

DRIVE DEVICE FOR CAMERA

BACKGROUND OF THE INVENTION

1. Field of the Invention:

This invention relates to drive devices for cameras in which film winding and other operations are motorized by respective drive sources.

2. Description of the Prior Art:

In the past, the drive device having a single motor by which charging of the various portions of the camera and film winding are performed was poor in efficiency because a large number of gear trains are necessary to transmit the driving torque of the motor to charge the various portions of the camera which are widely different in positions. Therefore, a high speed charging was realized only by increasing the number of batteries at a time.

To improve this, it is considered to use two motors for charging the various portions of the camera and winding up film respectively in combination with respective transmission systems whose speed reduction ratios are set to optimum values, thereby giving an advantage that the charging speed can be increased with the limitation of the number of batteries to a minimum.

In such a case, the two motors must be initialized at the same time soon after the shutter is closed. Or otherwise, the charging and the winding could not be completed in a shortest time. In the early stage of current supply to the motor, however, overcurrent (rush current) of intensity dependent on the internal resistance of the motor is allowed to flow. Such a sudden outflow of large current from the battery results in very large a drop of the battery voltage due to the internal resistance of the battery itself. Therefore, the coincidence of the starts of energization of the two motors leads to a high possibility for the battery voltage to fall below the minimum satisfactory operating level for a microcomputer or like control means. Thus, the operation of the microcomputer will often be troubled.

Meanwhile, the conventional motorized winding device was made also serve to charge the various portions of the camera by using a common drive source of the film winding-up system. For this reason, each time the camera was charged, the film winding-up system, too, was driven to move regardless of whether or not the camera was loaded with a film cartridge in a chamber therefor. Recently there has been proposed a camera which enables the efficiency of charge to be increased, electrical energy to be saved, and the winding period to be shortened, by using separate motors assigned to the film winding and the camera charging respectively. But, even in such a camera, the wind-up-motor and the charge motor have a common current supply circuit. Therefore, the circuit has, despite the camera is unloaded, to supply current to the wind-up motor too. As the wind-up motor is associated with a driving torque transmission of large mass, large wasteful consumption of electrical energy and fruitless lowering of durability resulted.

In this connection it should be noted that if the current supply circuit is made responsive to unloading of the camera, it becomes impossible to check the motorized functions of the camera in advance of its use, because all the motors do not work. Also, if the photographer pushes down the release button to check the operation of the wind-up motor under the condition that the back cover of the camera is open, the release of the shutter is not followed by the operation of the drive sprocket for advancing film or the take-up spool. So he will mistake it for occurrence of a malfunction of the camera.

Also, whilst the film winding was motorized, to advance the film by one frame still relied on the mechanism that had so far conventionally been employed in the manually operated cameras. This mechanism arrests the driving torque transmission between the motor and the take-up spool in response to detection of when the film has advanced one frame. In such a motorized camera, the current supply to the motor was cut off by using a mechanical switch arranged to open when the transmission is arrested.

Though the use of such a one-frame indexing mechanism is prerequisite for the manually operated cameras, it is not always necessary to the motorized cameras. So, in recent years, omission of the aforesaid mechanism from the motorized camera has already been made.

Then, instead of using the mechanism, the advancement of the film through the length of one frame is controlled by adjusting the period of energization of the motor for each shot. In order to rapidly stop the motor with the help of braking means, both ends of winding of the motor may be either short-circuited, or reversely biased. For this purpose, it is, however, required that even after the termination of energization of the motor, a set of transistors controlling the current supply to the motor be continued operating by sustaining the flow of base current to them not only when the braking method of supplying reverse current to the motor is employed, as a matter of course, but also when another method of short-circuiting the ends of winding of the motor is employed. To fulfill this requirement, a drawback has been produced that, as the rate of electrical power consumption per shot increases, the life-time of the electrical power source or battery is very shortened. For this reason, it is desired to minimize the braking period of the wind-up motor as far as possible.

Meanwhile, the motorized cameras have generally the continuous shooting mode. In order to increase the firing rate of shots for a high speed shooting, the initiation of a shutter operation must be brought into as near coincidence with the termination of the film winding operation as possible. In the past, this techniqe has not been compatible with the above-described measure of minimizing the braking period, because the removal of the braking action from the wind-up motor allows for later slight movement of the film due to the elasticity of film itself and the relax of the gear train from the stress of transmitting the film to occur during the next exposure. Thus, a problem has been produced that blurred images are photographed.

SUMMARY OF THE INVENTION

An object of the invention is to provide a motorized camera which has overcome all the above-described drawbacks.

Another object is to provide a drive device for such a camera with means making it possible to prevent the battery voltage from falling below the satisfactory operating level as the rush current flows to a plurality of electric motors.

These and other objects of the invention will become apparent from the following detailed description of embodiments thereof.

BRIEF DESCRIPTION OF THE DRAWINGS

FIGS. 9A, 9B and 10 are flow charts.

FIGS. 17A to 17C and 18 are flow charts of the third embodiment.

FIG. 19 is a perspective view of a shutter unit as a fourth embodiment of the invention.

DETAILED DESCRIPTION OF THE PREFERRED EMBODIMENTS

Figure 1:
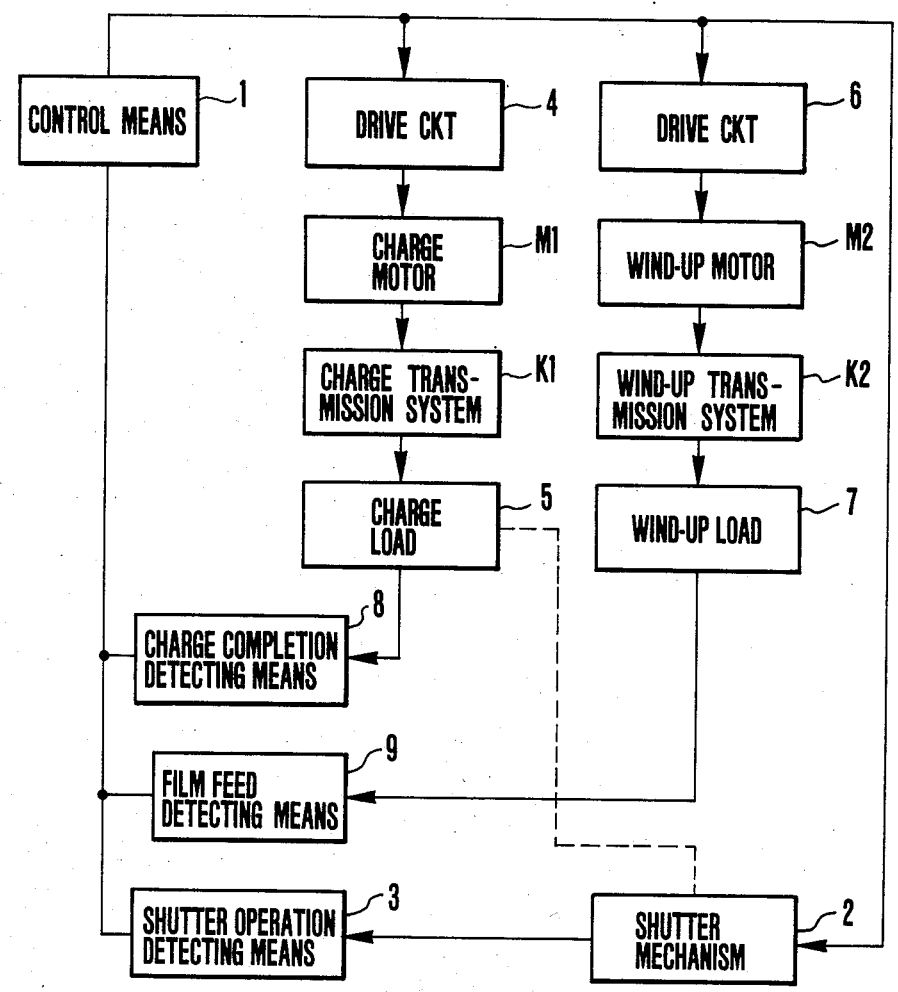
FIG. 1 is a block diagram illustrating a first embodiment of the invention.

FIG. 1 illustrates the fundamental structure of one embodiment of the invention.

Control means 1 comprising, for example, a microcomputer, activates a shutter mechanism 2 in a sequence of operation. When the shutter operation terminates, this termination is detected by shutter operation detecting means 3. This detection signal is applied to the control means 1. Responsive to this, the control means 1 renders at first a drive circuit 4 operative, thereby current supply to a charge motor M1 is started. Thereby the charge motor M1 rotates, and, through a charge transmission system K1, a charge load 5 necessary to be charged such as the shutter mechanism, a mirror up-and-down mechanism, and a lens drive mechanism, is charged. In a delay from the start of energization of the charge motor M1 by a time necessary for the rush current flowing thereto in its early stage to disappear so that the current value becomes stable, the control means 1 then renders another drive circuit 6 to start current supply to a wind-up motor M2. Rotation of the wind-up motor M2 is transmitted through a wind-up transmission system K2 to a wind-up load 7 (including film), thereby the film is wound up.

Charge completion detecting means 8 detects the fact that all the various portions of the camera have been charged. Responsive to this detection signal, the control means 1 controls the stoppage of the charge motor M1 and so on.

Film feed detecting means 9 senses motion of the film and detects winding-up states such as winding in progress, winding just before completion, and the completion of the winding. Responsive to this detection signal, the control means 1 controls the deceleration and stoppage of the wind-up motor M2. For note, rewinding may be carried out either by another motor, or by the wind-up motor M2. Also, two or more motors may be used for charging the varous portions of the camera. In this case, the starts of energization of these motors have to be displaced successively by a time the rush current takes to flow.

According to this embodiment, the starts of current supply to the charge motor M1 and wind-up motor M2 are displaced from each other by the time the rush current takes to flow. Therefore, an excessive load is prevented from being laid on the battery, and an abnormal drop of the battery voltage can be avoided.

Figure 2:
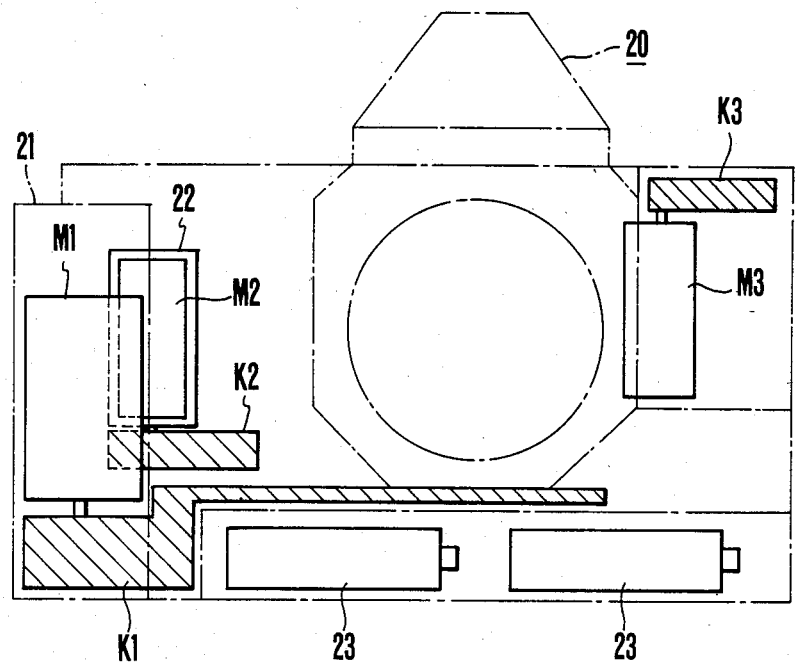
FIG. 2 is a front elevational view of a camera employing the scheme of FIG. 1.

An example of the camera embodying the scheme of FIG. 1 is shown in FIGS. 2 to 8. FIG. 2 shows an arrangement of the aforesaid motors M1 to M3 along with the torque transmissions K1 to K3 respectively associated therewith. Though the change of the atmospheric conditions hardly affects the load on the charge motor M1, its power and size must be relatively large, because it governs charging of the shutter, diaphragm, focusing lens and mirror together with their operating mechanisms. For this reason, the motor M1 is placed within a grip 21 formed as protruding from the front left hand corner of the camera housing 20 as viewed from the front. The wind-up motor M2 occupies the space within a hollow core of a takeup spool 22. The rewind motor M3 takes its place near a film cartridge chamber in the front right hand side corner of the camera housing. An electrical power source has four cylindrical type batteries 23.

Figure 3:
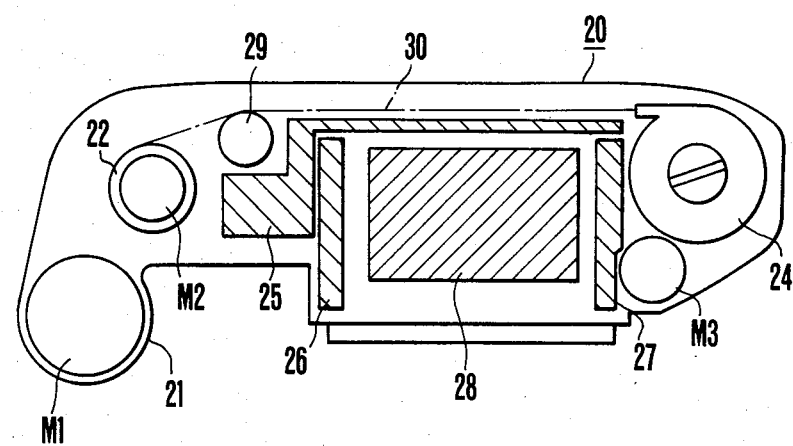
FIG. 3 is a top view of the camera of FIG. 2.

The relative positions of some of the aforesaid parts are clearly shown in FIG. 3 as viewed from the above of the camera 20, where the film cartridge is denoted by 24, the shutter of vertically running blade type by 25, the mirror operating mechanism by 26, the control mechanism for the diaphragm of the lens by 27, the focusing mechanism by 28, and a sprocket mechanism for indexing the advanced length of one frame of the film 30 by 29.

Figure 4:
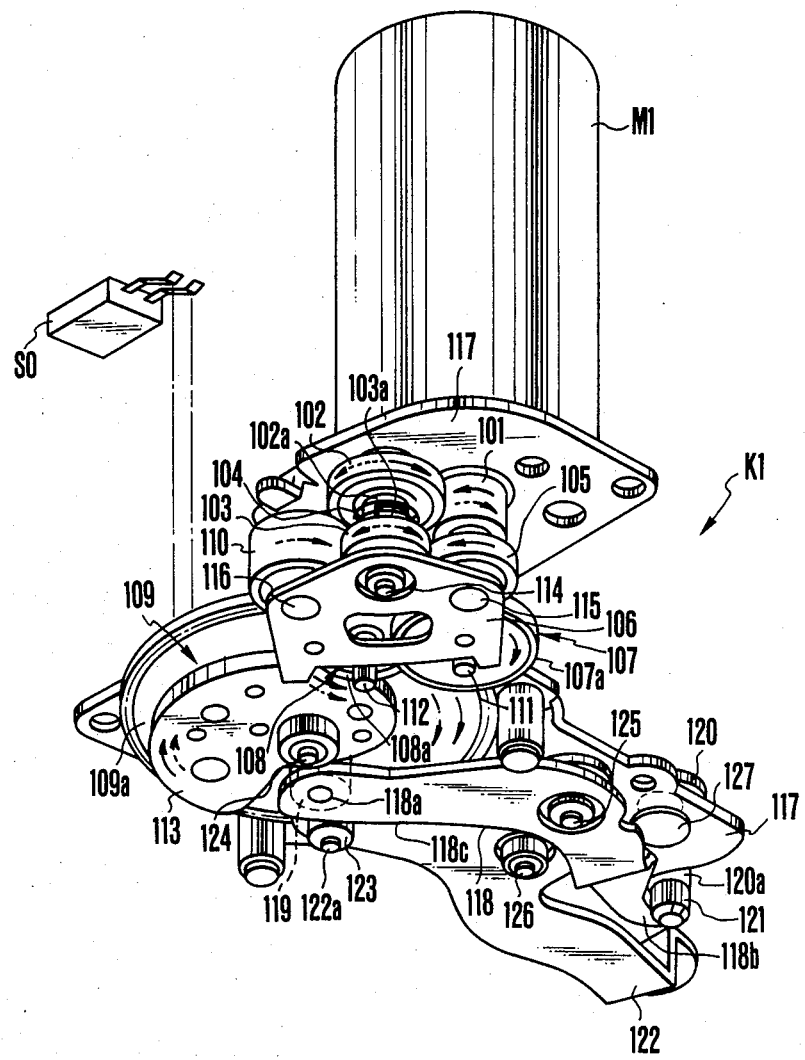
Fig. 4 is a perspective view of a charge transmission system.

In FIG. 4 there is shown the torque transmission K1 of the charge motor M1 in detail. A pinion gear 101 on the output shaft of the motor M1 meshes with a gear 102 which constitutes a 2-stage gear together with another gear 103. The gears 102 and 103 are independently rotatably mounted on a shaft 114 fixedly mounted to a base plate 117, and have thrust projections 102a and 103a on the confronting faces thereof so that when rotated, they are unified, but when in axial directions, they are movable relative to each other. The opposite face of the gear 103 is frictionally pressed against a planetary lever 106 by a compressed spring 104 between the gears 102 and 103 so that the planetary lever 106 turns to follow up the rotation of the gear 103. A gear 105 is rotatably mounted on a pin 115 planted to the planetary lever 106 and meshes with the gear 103. Another 2-stage gear 107 has a large gear 107a and a small gear (not shown) fixedly mounted thereon and is rotatably mounted on a pin 111 planted to the base plate 117. When the gear 103 rotates in a clockwise direction, and the gear 105 in a counterclockwise direction (indicated by arrow), the planetary lever 106 is turned in the clockwise direction, thereby the large gear 107a is brought into meshing engagement with the gear 105. A gear 108 is rotatably mounted on a pin 112 planted to the base plate 117, and comprises a large gear 108a and a small gear (not shown) formed on the upper surface of the gear 108a in fixed relation. The large gear 108a is always meshing with the small gear 107b. A gear 110 is rotatably mounted on a pin 116 planted to the planetary lever 106 and is always meshing with the gear 103. When the gear 103 rotates in the counterclockwise direction, the planetary lever 106 is turned in the clockwise direction, thereby the gear 110 is brought into meshing engagement with the large gear 108a. A cam gear 109 is rotatably mounted on a pin 124 planted to the base plate 117 and has a gear 109a and a cam disc 113. The gear 109a is always meshing with the small gear of the gear 108. Depending on the direction of rotation of the motor M1, the above-described transmission is changed over between high and low speed reductions, of which the former is selected when the motor M1 rotates in the counterclockwise direction so that as all the parts rotate in the respective directions indicated by solid line arrows and the planetary lever 106 turns in the clockwise direction, a gear train of the pinion 101→the gears 102 and 103→the gear 105→the gear 107 (large gear 107a and small gear 107b)→gear 108 (the large gear 108a and the small gear 108b)→the cam gear 109 is established, the speed of rotation of the cam gear 109 being slow. Conversely when the motor M1 rotates in the clockwise direction, as all the parts rotate in the directions indicated by dashed line arrows and the planetary lever 106 turns in the counterclockwise direction, another train of gears 101→102, 103→110→108→109 is established, and the cam gear 109 rotates at a high speed. For note, the aforesaid two gear trains are so arranged that the direction of rotation of the cam gear 109 is clockwise no matter which direction the rotation of the motor M1 may take.

A first shutter charging lever 118 is pivotally mounted on a pin 125 planted to the base plate 117 and has a roller 119 rotatable about a pin 118 fixedly mounted on one arm end thereof, the other arm of which is formed to a cam 118b. The roller 119 rides on the outer periphery or camming surface of the cam disc 113, so that as the camming surface goes up and down, swinging movement is imparted to the first shutter charging lever 118. And, such movement causes the cam 118 also to swing. A second shutter charging lever 120 is pivotally mounted on a pin 127 planted to the base plate 117 and has a roller 121 rotatable about a pin 120a fixedly mounted thereon. The roller 121 is in contact with the cam 118 to transmit movement of the first lever 118 to the second lever 120. And, the second lever 120 controls the charging operation of the shutter mechanism (not shown).

A lever 122 for charging the known diaphragm control mechanism, mirror mechanism and focusing mechanism is pivotally mounted on a pin 126 fixedly planted to the base plate 117, and has a roller 123 rotatable about a pin 122a fixedly mounted on one arm thereof. This roller 123 is in contact with a second cam 118c of the first shutter charging lever 118. Therefore, the lever 122 turns to follow up the lever 118, thereby the diaphragm control mechanism and mirror mechanism are charged.

A switch S0 cooperates with a signal disc fixedly carried on the opposite surface of the cam gear 109 to that having the cam disc 113 to produce an output signal representing when motion of the charge motor M1 arrives at te cam 113.

Figure 5:
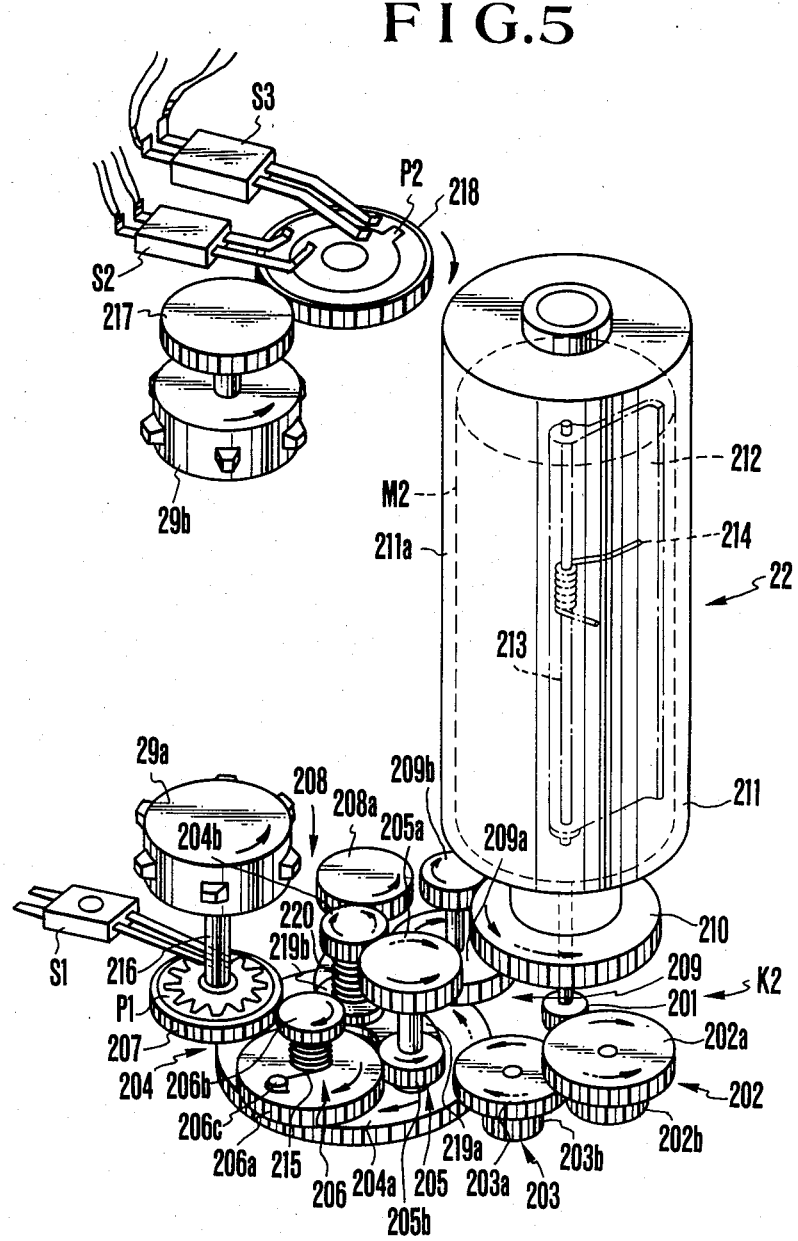
FIG. 5 is a perspective view of a wind-up transmission system.

In FIG. 5, the torque transmission of the windup motor M2 is shown in detail. A pinion 201 on the output shaft of the motor M2 meshes with a 2-stage gear 202 at a large one thereof. Another 2-stage gear 203 meshes with the first one in between the large and small gears 203a and 202b. A third 2-stage gear 204 meshes with the second one in between the large and small gears 204a and 203b. On a shaft between the large and small gears 204a and 204b is pivotally mounted a planetary lever 219a through a bearing 219b. A compression spring 220 between the small gear 204b and the bearing 219b urges the latter in frictional contact on the large gear 204a. This frictional contact causes the planetary lever 219a to turn in either direction depending on the direction of rotation of the gear 204. The planetary lever 219a has two arms on which fourth and fifth 2-stage gears 205 and 208 are rotatably mounted. Positioned adjacent the fourth 2-stage gear 205 is a sixth 2-stage gear 206 whose large and small gears 206a and 206b are rotatable relative to each other but imparted with a one-way clutching function by a coil spring 215 therebetween. Since one end of the coil spring 215 is fixedly secured to a boss 206 on the upper surface of the large gear 206a, as it rotates in a clockwise direction, the coil spring 215 and the coaxial portion of the small gear 206b are constrained to rotate in unison. A gear 207 meshes always with the small gear 206b and is drivingly connected to a sprocket 29a through a shaft 216. A pulse forming disc P1 whose entire circumference is divided into 12 equal parts is fixedly mounted on the upper surface of the gear 207 and cooperates with a pair of probes of a switch S1. So when the sprocket 29a rotates one revolution, the switch S1 produces twelve pulses. With 6 teeth on the drive sprocket 29a, as the camera of 35 mm full size advances the film by one frame for four thirds of its revolution, therefore, the number pulses produced from the switch S1 is sixteen for each cycle of film winding operation. Needless to say, it is also possible to use a desired number of equal parts of the pulse disc P1. If the duty drive method is employed for controlling the speed of rotation of the motor M2, it is preferred to increase the number of equal parts.

A seventh 2-stage gear 209 is positioned adjacent the sixth one 208 and its small gear 209b meshes always with a spool gear 210 which is fixedly mounted to the bottom of a spool 211. A rubber tube of thin thickness 211a covers the entire area of that portion of the circumferential surface of the spool 211 which receives film to facilitate automatic snatching up of the film leader. A film pressor plate 212 is positioned adjacent the outside of the spool 211 and pivotally mounted on a shaft 213. A spring 214 urges the plate 212 toward the spool 211. This film pressing means facilitates automatic convolution of the film on the spool 211. Though only one pressor is shown, another one is used on the opposite side.

Another sprocket 29b is driven to rotate by the moving film only. Its rotation is transmitted to a gear 217 through a common shaft and further therefrom to another gear 218 constituting part of a detector. The ratio of the number of teeth of the gear 217 to that of the gear 218 is predetermined to be 3:4. A pulse disc P2 is fixedly mounted on the upper surface of the gear 218, consituting part of each of switches S2 and S3 which produce one pulse for one revolution of the gear 218. The switches S2 and S3 are so arranged that the former is closed earlier than the latter by a time for a prescribed phase of rotation of the pulse disc P2. The pulse from the switch S2 changes the driving mode of the wind-up motor M2 to the duty drive, thereby the motor M2 is decelerated. For, as the switch S3 produces the pulse in that time, the motor M2 rapidly stops when it has been braked.

To control the wind-up motor M1 in such a manner is to advance the film by one frame of the 35 mm full size. As a matter of course, if the tooth ratio of the gears 217 and 218 is changed to 3:2, or if, with the tooth ratio left unchanged from 3:4, the pulse disc P2 is divided to two equal parts so that for every one half of revolution, one pulse is obtained, the film will be advanced by half size for each shot. If, in this case, two pulses are used to form one cycle of operation of the motor M2, it will also be possible to bring the advanced length of film back to the full size. Further, if the acceptabl number of pulses is made to change over between one and two for every one shot, the camera will get a capability of operating with selection of the full and half sizes of the frame.

The driving torque of the motor M2 transmits as follows: When the motor M2 rotates in a counterclockwise direction, as all the parts rotate in respective directions indicated by solid line arrows, the gear 204 is rotated in a clockwise direction, thereby the planetary lever 219a is turned in the same direction to bring the small gear 205a into meshing engagement with the large gear 206a. Thus, a large speed reduction is established: Pinion gear 201→gear 202 (large gear 202a, small gear 202b)→the gear 203 (large gear 203a, small gear 203b)→the gear 204 (large gear 204a, small gear 204b)→the gear 205 (large gear 205a, small gear 205b)→the gear 206 (large gear 206a, small gear 206b)→the gear 207→the drive sprocket 29a. Another large speed reduction is also established: The gear 204 (large gear 204a, small gear 204b)→the gear (large gear 208a, small gear 208b)→the gear 209 (large gear 209a, small gear 209b)→the spool gear 210→the spool 22.

Conversely when the motor M2 rotates in a clockwise direction, as all the parts rotates in respective directions indicated by dashed line arrows, the gear 204 is rotated in the counterclockwise direction, thereby the planetary lever 219a is turned in the counterclockwise direction to bring the large gear 205a into meshing engagement with the spool gear 210 directly. Thus, a small speed reduction is established: The pinion gear 201→the gear 202 (large gear 202a, small gear 202b)→the gear 203 (large gear 203a, small gear 203b)→the gear 204 (large gear 204a, small gear 204b)→the large gear 205a→the spool gear 210. In this mode, however, the transmission to the drive sprocket 29a is cut off, and the drive sprocket 29a becomes freely rotatable.

Thus, the two transmissions between the motor M2 and the spool 22 are selectively operated depending upon the direction of rotation of the motor M2. Specifically speaking, when in the counter-clockwise direction, the spool 22 rotates at a low speed, while when in the clockwise direction, it rotates at a high speed. It is to be noted here that in either case, the direction of rotation of the spool 22 is always counterclockwise.

It should be pointed out that the choice of the counterclockwise rotation of the motor M2 is exercised only when the camera is set to an automatic film loading mode. Because the high speed reduction of the system K2 operates, the sprocket 29a is driven to rotate, pulling the film out of the cartridge, while the fed portion of the film is taken up on the rotating spool 22. In the subsequent or one-frame-at-a-time or continuous run mode, by the clockwise rotation of the motor, the system K2 is switched to the low speed reduction, driving the spool 22 only to rotate at a high speed. Of course, the wind mode may otherwise be operated by the counterclockwise rotation of the motor M2. Even if so, no slack loop of film between the drive sprocket 29 and the spool 22 is formed, because the peripheral speed of the spool 22 is previously adjusted to be faster than that of the drive sprocket 29a. In other words, the sprocket 29 functions as a drive source for the film only when the film is not pulled by the spool 22. For the other time, it acts merely as an idler.

Figure 6:
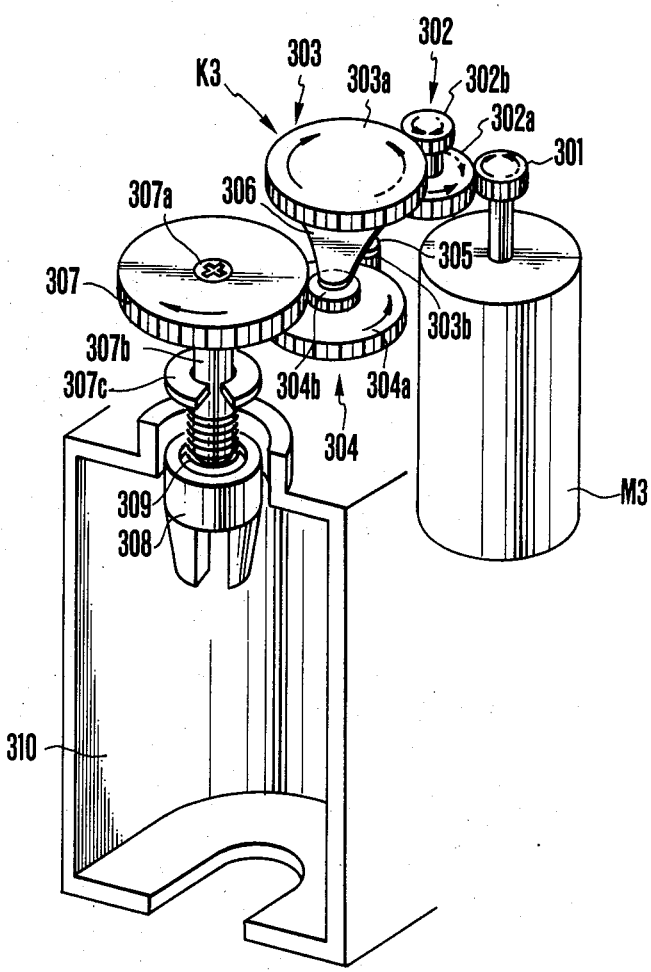
FIG. 6 is a perspective view of a rewind retransmission system.

In FIG. 6, a torque transmission of the rewind motor M3 is shown in detail. A pinion gear 301 on the output shaft of the motor M3 meshes with a large gear 302a of a 2-stage gear 302 whose small gear 302b meshes with a large gear 303a of another 2-stage gear 303. A planetary lever 306 is pivotally mounted on a common shaft of the gear 303. A compression spring 305 between the small gear 303b and the planetary lever 306 urges the latter in frictional contact with the large gear 303a. By this frictional contact, the planetary lever 306 is caused to follow up the direction of rotation of the gear 303. The free end of the planetary lever 306 rotatably carries a third 2-stage gear 304 having a large gear 304a and a small gear 304b. A gear 307 is fixedly mounted to one end of a shaft 307b by a screw fastener 307a, the opposite end of which movably carries a rewind fork 308. The fork 308 projects into a cartridge chamber 310 and is arranged to be engageable with a hub of the film cartridge (not shown). Positioned between a collar 307c on the shaft 307b and the shoulder of the fork 308 is a coil spring 309 to allow for the fork 308 to retract from the chamber when the film cartridge is inserted thereto or removed therefrom.

When the motor M3 rotates in a clockwise direction, the gear 303 is rotated in the same direction together with the planetary lever 306, thereby the small gear 304b is brought into meshing engagement with the gear 307. Thus, a driving torque transmission is established: The pinion gear 301→the gear 302 (large gear 302a, small gear 302b)→the gear 303 (large gear 303a, small gear 303b)→the gear 304 (large gear 304a, small gear 304b)→the gear 307→the fork 308. Conversely when the motor M3 rotates in a counterclockwise direction, the planetary lever 306 is turned in the same direction, thereby that transmission is cut off in between the small gear 304b and the gear 307. Hence, for, in the wind mode, the rewind motor M3 and transmission K3 do not partake in increasing the load on the winding-up motor M2, a few angles the rewind motor M3 rotates in the counterclockwise direction is sufficient.

Though, in each of the transmission systems K1 to K3 shown in FIGS. 4 to 6, use is made of the planetary gear in changing over between two values in the speed reduction ratio in automatic response to change of the direction of rotation of the motor, it is also possible to use a one-way clutch as such means.

Figure 7:
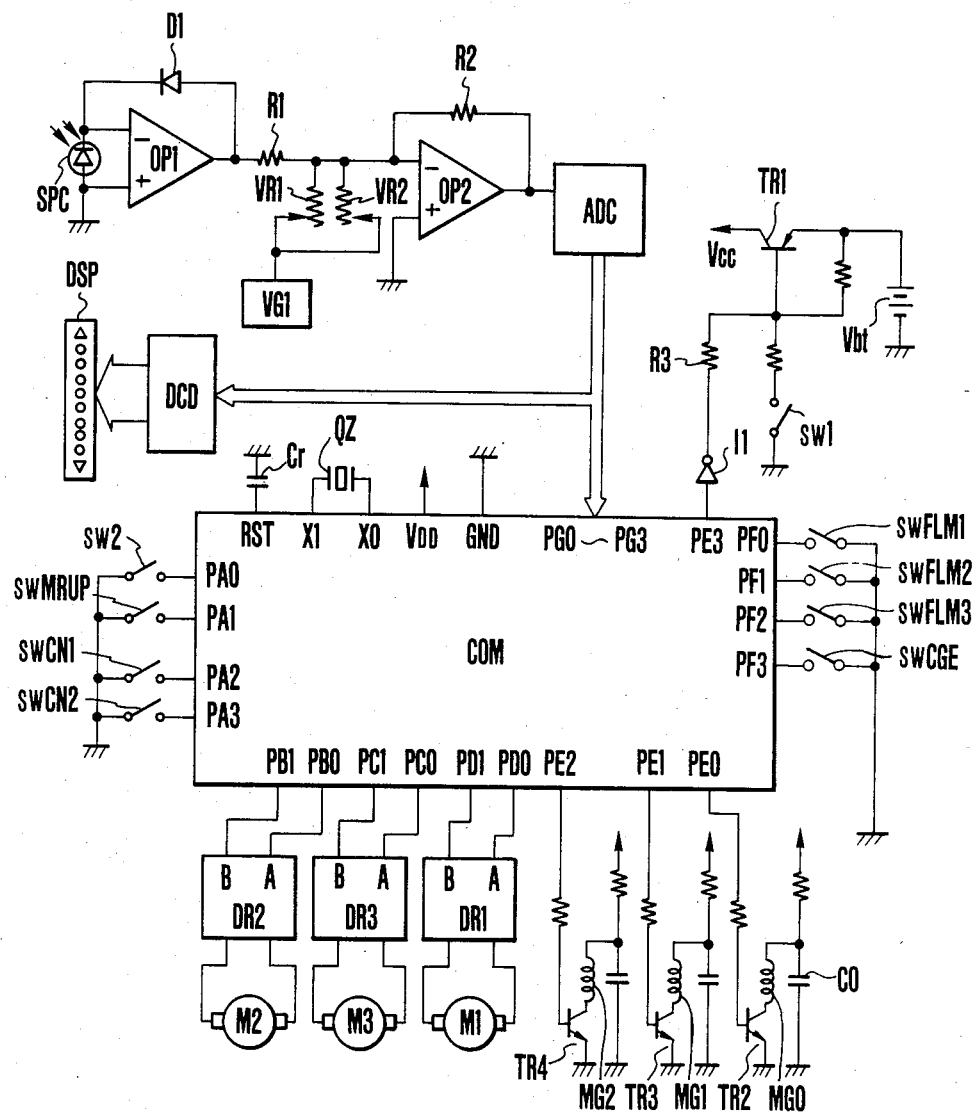
FIG. 7 is an electrical circuit diagram of a microcomputer and peripheral circuits.

FIG. 7 illustrates a practical example of the circuitry of the camera in which as the control means of FIG. 1 use is made of a microcomputer COM. A silicon photo cell SPC is positioned to receive light from an object to be photographed and is connected between two inputs of an operational amplifier OP1 of high input impedance with a compression diode D1 connected in the feedback loop thereof. The operational amplifier OP1 produces an output signal Bv representing the logarithm of the brightness of the object through a resistor R1. Variable resistors VR1 and VR2 are connected to a constant voltage generator VG1 and produce film sensitivity information Sv and aperture value information Av. Another operational amplifier OP2 having a resistor R2 in the feedback loop thereof computes an exposure value i.e. shutter time information Tv based on the formula: Tv=(Bv+Sv−Av). The shutter time information Tv is converted to a 4-bit digital value by an A/D converter ADC and then displayed by display device DSP within the finder through a decoder driver DCD, and applied to input ports PG0 to PG3 of the microcomputer COM. For note, 4-bit binary coded values [0001] to [1000] correspond to 1/1000 sec. to ½ sec. and those [0000] and [1001] or more represent warning signals in the display.

When a release button is pushed down to a first stroke, a power switch sw1 is closed, thereby a transistor TR1 is turned on to supply electrical power as a voltage Vcc from a battery Vbt to the various portions of the circuitry. Though not given the Vcc-labelled arrow in the drawing, the operational amplifiers and the A/D converter, for example, are of course supplied with the electrical power. Even after the switch sw1 is opened, the power supply is sustained so long as an output port PE3 of the microcomputer COM produces a signal of low level which is applied through an inverter I1 and a resistor R3 to the base of the transistor TR1.

The microcomputer COM has a terminal RST connected to a capacitor Cr at one pole with the opposite grounded, terminals X0 and X1 between which is connected a quartz oscillator QZ, another terminal VCC connected to the voltage source Vcc, and another terminal GND grounded.

Its input ports PA0 to PA3 are respectively connected to a release switch sw2 arranged to turn on when the release button is pushed down to a second stroke, a mirror-up sensing switch swMRUP arranged upon mirror-up to turn off and upon mirror-down to turn on, a shutter opening sensor or switch swCN1 arranged to turn off or on when the leading curtain of the shutter has run down or charged respectively, and a shutter closing sensor or switch swCN2 arranged to turn off or on when the trailing curtain of the shutter has run down or charged respectively.

Another input ports PF0 to PF3 are respectively connected to a first film switch swFLM1 comprising the pulse disc P1 and the pair of contacts S1 (FIG. 5), a second film switch swFLM2 comprising the pulse disc P2 and the pair of contacts S2 (FIG. 5), a third film switch swFLM3 comprising the pulse disc P2 and the pair of contacts S3 (FIG. 5), and a charge switch swCGE comprising the signal disc on the cam gear 109 (FIG. 4) and the pair of contacts S0 and arranged to turn on when the charging operation is completed.

Its output ports PE0 to PE2 are connected to the bases of transistors TR2 to TR4 respectively controlling the current supply to a permanent magnet-equipped solenoid MG0 of the first latch for beginning a mechanical release operation, a leading curtain release solenoid MG1 and a trailing curtain release solenoid MG2.

Another output ports PB0 and PB1 are connected to a drive circuit DR2 for the wind-up motor M2. Another output ports PC0 and PC1 are connected to a drive circuit DR3 for the rewind motor M3. Another output ports PD0 and PD1 are connected to a drive circuit DR1 for the charge motor M1.

Figure 8:
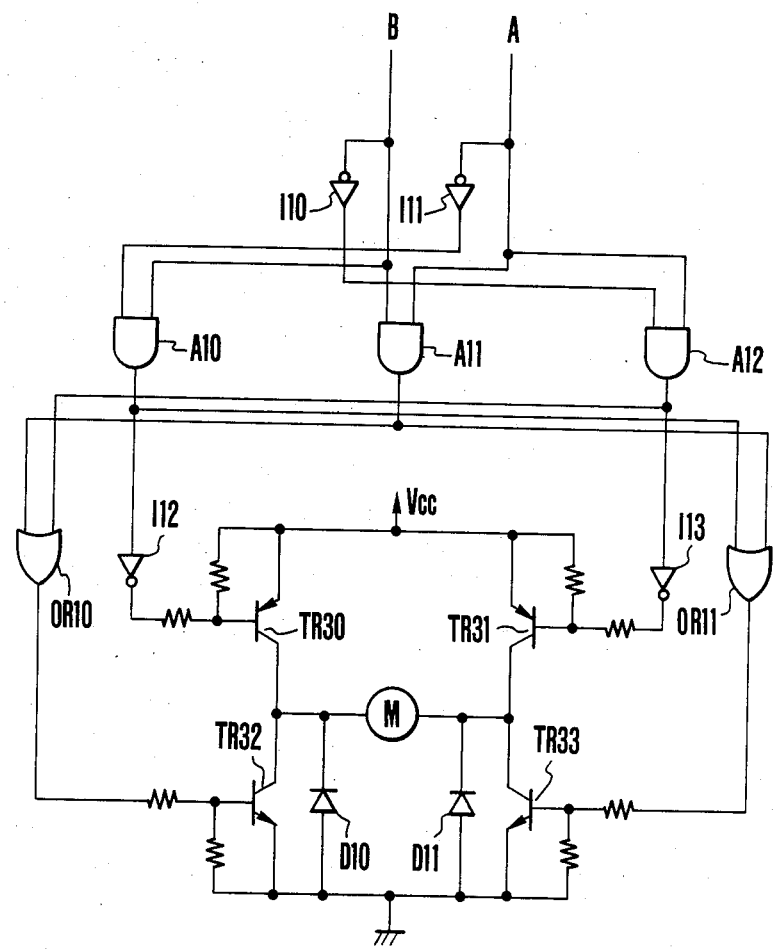
FIG. 8 is an electrical circuit diagram of a drive circuit.

FIG. 8 illustrates the details of each of the drive circuits DR1 to DR3, where two input terminals A and B receive a 2-bit signal. At first, for A=1, B=0, because the input B is inverted by an inverter I10, the output of an AND gate A12 is "1", and the output of OR gate OR10 is also "1", thereby a transistor TR32 is turned on. Also because the output of an inverter I13 is "0", a transistor TR31 also is turned on. Therefore, the voltage Vcc of the battery is applied across the motor M with current flowing in such a direction that the motor M rotates in a normal direction.

To A=0, B=1, because the input A is inverted by an inverter I11, the output of an AND gate A10 becomes "1", the output of an OR gate OR11 also becomes "1", and the output of an inverter I12 becomes "0", thereby transistors TR30 and TR33 are turned on. As current flows to the motor M in the reverse direction, the motor M rotates in the reversed direction.

For A=1, B=1, the output of an AND gate A11 is "1". Therefore, the outputs of the OR gates OR10 and OR11 take "1" simultaneously, turning on the transistors TR32 and TR33. Hence, if this signal appears at a time during the rotation of the motor M, not only the current supply to the motor is cut off no matter which direction of rotation of the motor M may be by diodes D10 and D11 and the transistors TR32 and TR33, but also the winding of the motor M is short-circuited to brake the motor M against the further rotation by inertia.

When A=0, B=0, all the outputs of the AND gates A10 to A12 have "0", causing the transistors TR30 to TR33 all to turn off, so that the motor M is in open state.

The operation of the microcomputer COM is next explained in detail by reference to the flow chart of FIGS. 9A, 9B and 10.

Step 1: By the supply of the battery voltage Vcc in response to closure of the first stroke dependent switch sw1, the microcomputer COM is started to operate. A train of clock pulses from the quartz oscillator QZ are received, and at the same time, a power-on reset is executed by the capacitor Cr. A built-in program counter is initialized to No. 0 address, causing program execution to begin with the block labeled "START". Here, all the flags are assumed to have "0" and all the output ports also to have "0".

Step 2: Inputs from the ports PA0 to PA3 (hereinafter referred to as "PA" inputs, and this holds for the other ports) are received. If all the portions of the camera are in their charged positions, then when the photographer further pushes down the release button to the second stroke, PA0=PA1=PA2=PA3=0 result. Thus the PA inputs have a value of [00H] in the hexadecimal number system.

Step 3: If the PA inputs are [00H], jump to step 5. If not, advance to step 4.

Step 4: Now assuming that the PA inputs are not [00H], then the PE3 output is changed to "0". Since, at the time of the power-on reset, all the output ports are "0", this command is meaningless. But because the program has a loop to step 1, it is at this time that it has meaning. (Latch release of the battery voltage Vcc).

Step 5: When the PA inputs are [00H], or when the photographer pushes the release button to the second stroke, procedure to exposure mode is executed. The PE3 output becomes "1", sustaining the ON state of the transistor TR1 to latch the voltage Vcc.

Step 6: The APEX value Tv of shutter time in the form of a 4-bit digital value from the A/D conVerter ADC is introduced. Since the number of bits is four, the possible decimal numbers are "0" through "15".

Step 7: Since the PG inputs of step 6 are stored in an accumulator A, this value is transferred to an internal register RG1.

Step 8: The PE0 output is changed to "1", causing the transistor TR2 turn on so that the capacitor C0 which has so far been charged to almost equal a voltage to the battery voltage Vcc is suddenly discharged to the first latch control solenoid MG0. Thereby, a mechanical release is actuated.

Step 9: The flow is waited for a certain time by a timer. A program for this purpose is, for example, to put a certain value into the accumulator A, and then subtract one by one from that value until A=0. The time necessary to do this may be used as the wating time. The program procedure is not shown because the flow chart would become very complicated. For note, TIME2 to TIME4 have similar programs.

Step 10: The PE0 output is then changed to "0", thereby the current supply to the first latch control solenoid MG0 is cut off. TIME1 may be determined to be slightly longer than the minimum time for which the first latch control solenoid MG0 is energized. After that, the mechanical sequence of operation goes on so that the diaphragm is closed down to the presetting, and the mirror is moved upward.

Step 11: The PA1 input representing the movement of the mirror is taken up. In a certain time from the release of the mirror from the latching connection by MG0, the mirror should reach the terminal end of movement.

Step 12: A routine for waiting the mirror until it reaches the non-viewing position. When this position is reached, step 13 is executed. This routine is provided for ascertaining that the mirror is moved away completely from the light path to the exposure aperture, before the shutter is opened.

Step 13: The flag F0 is examined. F0=1 represents the film end.

Step 14: The flag F1 is examined. F1=0 represents the termination of each cycle of film winding operation.

Step 15: Whether or not the value of the internal register RG1 is "0" is examined. As has been described above, when the computed shutter time is shorter than 1/1000 sec., the PG inputs take "0000", or RG1=1.

Step 16: If RG1=0, it is forced to RG1, or the shutter time is fixed to 1/1000 sec.

Step 17: Whether or not RG1>8, or the shutter time is longer than 1/8 sec. is examined.

Step 18: If RG1 >8, it is forced to RG1=8, or the shutter time is fixed to ⅛ sec.

Step 19: The accumulator A is incremented by "1". Routines in steps 19 to 22 are to convert the value of the internal register RG1 representing the shutter time to elongate as multiplied by 2 in sequence.

Step 20: "1" is subtracted from the value of the internal register RG1, and then put again into it.

Step 21: Whether or not RG1=0 is examined. If it is "0", jump to step 23. If not, advance to step 22.

Step 22: The content of the accumulator A is shifted to the left, or doubled. On assumption that the accumulator A has 8 bits, then when, for example, RG1=8, the content of the accumulator A is shifted 7 times. Since the initial content of the accumulator A was [00000001], it, therefore, becomes [10000000].

Step 23: The content of the accumulator A is transferred to the internal register RG1. Thus, the shutter time is elongated in multiplied-by-2 serial fashion.

Step 24: The PE1 output is changed to "1", causing the leading curtain control solenoid MG1 to be supplied with current. The leading curtain starts running.

Step 25: A waiting time is formed by a constant time timer.

Step 26: The content of the internal register RG1 is reduced by "1".

Step 27: The steps 25 to 27 are repeated until the content of the internal register RG1 becomes "0". In this step, an actual time of the shutter time is counted.

Step 28: The PE2 output is changed to "1", causing the trailing curtain control solenoid MG2 to be supplied with current. The trailing curtain runs down, terminating the operation of the focal plane shutter.

Step 29: A time necessary for the trailing curtain to travel across the film gate is formed by a constant time timer.

Step 30: Reset to PE1=PE2=0. So the leading and trailing curtain control solenoids MG1 and MG2 are deenergized.

Step 31: An input from the trailing curtain sensor switch swCN2 is taken up.

Step 32: A routine for waiting swCN2 to open or waiting up for the completion of the running down of the trailing curtain. When it has run down, advance to step 33.

Step 33: PD0=1, PD1=1 render the drive circuit DR1 operative. The charge motor M1 starts to rotate. Thereby, the shutter, mirror and automatic diaphragm are charged.

Step 34: Wait for a time from the start of current supply to the motor M1 to start energization of te wind-up motor M2, until the current flowing through the winding of the motor M1 becomes stable. Thereby, the rush currents in the initial stages of operation of the motors M1 and M2 are prevented from superimposing one upon another.

Step 35: PB0=0, PB1=1 render the drive circuit DR2 operative. The motor M2 starts to rotate. Thereby the film is wound up.

Step 36: Set a constant K in a timer TMR for timer interruption. K is taken at a value depending on the winding-up speed of the film, the number of equally divided parts of the pulse disc P1 (FIG. 5) of the first film switch swFLM1, and the period of instruction cycle of the microcomputer COM.

Step 37: Start the timer TMR for timer interruption. Enable the timer interruption (EN T). Input a constant M into the internal register RG2. Set the flags F0=F2=F3=0, F1=1. The flag F2 represents the ON or OFF state of the first film switch swFLM1, and the flag F3 represents the ON or OFF state of the second film switch swFLM2. The timer TMR since started is decremented repeatedly independently of the main program routine. For every prescribed time (dependent on the constant K), interruption is effected with jump from the executed program to a specific timer interruption address. Here, the timer interruption procedure is explained by reference to FIG. 10.

Timer Interruption Procedure

Step 101: Prohibit decrement and interruption of timer TMR.

Step 102: Input PF0 from the first film switch swFLM1.

Step 103: If PF0=0, advance to step 104. If PF0=1, jump to step 114.

Step 104: Because PB0 remains the same as that set in step 35, the current supply to the wind-up motor continues.

Step 105: Test flag F2. Because F2 has been set in step 37, advance to step 106.

Step 106: Decrease the content of the internal register RG2 by "1".

Step 107: Test RG2=0. Since, in the up-to-present program, RG2=M−1, for, as M is somewhat large a value, it does not become "0", advance to step 108.

Step 108: Input PF1 from the second film switch swFLM2.

Step 109: Test PF1=0. If the film is not being advanced just before the terminal end of length of one frame yet, PF1=1. So, advance to step 110.

Step 110: Input PF2 from 3rd film switch swFLM3.

Step 111: Test PF2=0. If the cycle of film winding operation is not completed yet, PF2=1. So advance to step 112.

Step 112: Set the constant K in the timer register again, causing the timer TMR to start so that interruption is enabled.

Step 113: Return to the original program under execution. The timer interruption subroutine is to turn away from the program under execution to going for testing the states of the three film switches swFLM1, swFLM2 and swFLM3 in every certain time. Since the program itself goes with the instructions each of which is executed at a very high speed, the recycling of the input of film winding up information in the certain period does not actually give rise to a problem.

Now assuming that a certain cycle of execution of the timer interruption subroutine is encountered with opening of the first film switch swFLM1, then jump from step 103 to step 114.

Step 114: Test flag F3=1. Since F3=0 has been set in step 37, advance to step 115.

Step 115: Test flag F2=1. Since F2=0 has been set in step 37, advance to step 116.

Step 116: Set flag F2 to "1". This means that the first film switch swFLM1 has turned off, in other words, the input PF0 has changed to 1.

Step 117: Set again the internal register RG2 to the constant M. Then, jump to beginning of the aforesaid subroutine with step 108. Here, for a little while, the winding-up is carried out. Suppose a moment just before the terminal end of one-frame movement of the film. Since, at this time, the second film switch swFLM2 turns on, PF1=0 appears, causing step 109 to be followed by step 118.

Step 118: Set flag F3 to "1". In the subsequent cycle of execution of the timer interruption subroutine, therefore, a jump to step 119 occurs at step 114.

Step 119: Set PB0=1. Since PB1=1 has been set in step 37, the wind-up motor M2 is deenergized, and, at the same time, braked. But inertia does not allow the motor M2 to stop immediately. So it continues rotating. By the subsequent cycle of execution of the timer interruption subroutine, as the first film switch swFLM1 changes from OFF to ON, step 103 is followed not by step 114, but by step 104. Since PB0=0 takes place again, the motor M2 is energized for the second time. Since, at this time, F2=1 as has already been set in step 116, advance to step 120.

Step 120: Set flag F2 to "0", and then jump back to step 117 where the constant M is set in the internal register RG2. In conclusion, after the second film switch swFLM2 turns on, that is, the winding up nears completion, as the ON-and-OFF operation of the first film switch swFLM1 recycles, the motor M2 is put under duty control to repeat driving-braking-driving-braking and so on. Thus, it is being decelerated.

When the cycle of film winding operation has completed, the third film switch swFLM3 is turned on. So, a jump from step 111 to step 121 takes place.

Step 121: Brake the motor M2 as in step 119.

Step 122: Set flag F1 to 0, which represents the termination of the film winding operation. Then, jump back to step 113 where the subroutine transits to the original program. Because step 112 is not in the path, no more interruption occurs.

Next assuming that the used film is of 24-exposure length, and the 24th frame has just been exposed, then energization of the motor M2 will only result in tension of the film. So, the first film switch swFLM1 can no longer turn on and off, causing the flag F2 to be left unchanged from "0" or "1". In step 106, therefore, the content of the internal register RG2 is subtracted by 1 in each cycle of execution of the timer interruption subroutine. When RG2=0 is reached in some cycle number, a jump from step 107 to step 123 takes place.

Step 123: Set PB0=PB1=0, causing both ends of the winding of the motor M2 to open.

Step 124: Set flag F0=0, which represents the film end.

The above-described loop beginning with the step 37 of the main routine is executed always until the next shot goes to step 15. Thus, the film winding operation is controlled accurately.

We now proceed to explain the remain of the main program routine.

Step 38: Input a signal representing that the shutter, mirror and automatic diaphragm have been charged from the charge switch swCGE.

Step 39: A routine comprised together with step 38 for waiting until the charging is completed. Of course, during this time, a necessary number of cycles of timer interruption procedure are carried out.

Step 40: Change PD0 output to 1, causing the charge motor M1 to be braked.

Step 41: Test the flag F0 which represents the film end. Now suppose the film is not all exposed, then advance to step 42.

Step 42: Similar to step 2.

Step 43: If the photographer continues pushing the release button with intension of shooting in the continuous run mode, the second-stroke dependent switch sw2 remains ON, so that the PA inputs have a hexadecimal number of [00H], causing a jump back to step 6: NEXT.

With the step 6, as has been described above, the photographing sequence begins. It should be pointed out here that without making determination of when the film winding operation is terminated, step 8 is executed to activate the first latch control solenoid MG0. In fact, the preparation for an exposure or the adjustment of the diaphragm to the presetting and the upward movement of the mirror, is carried out regardless of whether or not the film winding operation in the preceding shot is terminated, thereby giving an advantage that the firring rate of shots is increased. After that, the termination of upward movement of the mirror is determined in step 12, and the termination of the film winding operation is determined in step 14. Until now, the timer interruption is repeated any number of times. Upon detection of the termination of the film winding operation, advance to the next step for shutter control.

Next explanation is given to the single frame shooting mode. Since, after each shot, the photographer must have continued pushing the release button in the second stroke, step 43 is followed by step 44.

Step 44: Test the completion of the winding by the timer interruption procedure, or F1=0. If not, repeat steps 41 to 44. Upon completion of the winding, jump back to step 1: START. In step 4, the battery voltage Vcc is then released from the latching. If the first stroke dependent switch sw1 also is OFF, the supply of the voltage Vcc is cut off.

Rewind Procedure

When the film is tensioned at an intermediate point during the winding operation, the execution of the timer interruption subroutine results in F0=1, causing the flow to be branched from step 41 to step 45.

Steps 45-47: Energize solenoid MG2 for a certain time, causing the trailing curtain to run down as in steps 28 to 30. This is because the film is protected against fogging when it happens that the photographer while having carelessly taken the lens off the camera body and been exposing the shutter to strong light, carries out the rewinding. Since both of the leading and trailing curtains are present in front of the exposure aperture, the strong light can be shut out perfectly from the film surface.

Step 48: Input a signal from the trailing curtain sensing switch swCN2.

Step 49: Wait for the completion of running down of the trailing curtain. Upon completion, then advance to step 50.

Step 50: Set PC0=0, PC1=1, causing the rewind motor M3 to rotate.

Step 51: Set the internal register RG2 to M1.

Steps 52-60 : Determine when the film leader comes across the drive sprocket 29a. This program for detecting the stoppage of the sprocket 29a from further rotation is similar to the film motion detecting program described in connection with the steps 102, 103, 105, 106, 107, 115, 116, 117 and 120 of the timer interruption procedure. Upon completion of the rewinding. Then advance to step 61.

Step 61: Change to PC0=1, causing the rewind motor M3 to stop.

Step 62: Reset flag F0 to "0" which represents the film end.

Step 63: Set PD0=0, PD1=1, causing energization of the charge motor M1. This is because the trailing curtain ran down in step 45 to prepare for the rewinding, for the shutter mechanism is charged.

Step 64: Input a signal from the charge switch swCGE.

Step 65: Wait for the completion of the charging before an advance to step 66.

Step 66: Stop the motor M1. Thus, the rewind procedure all comes to end. Exit this subroutine.

In connection with the continuous shooting mode, we should consider a particular situation where the charging of the shutter, mirror and automatic diaphragm terminates so far earlier than the termination of the film winding operation that after the first latch control solenoid MG0 has been energized to actuate the next camera release, the film is tensioned, as the film end comes up.

In this situation, though the diaphragm has been closed down and the mirror has been moved upward in response to energization of the solenoid MG0, the film gets stopped from further movement to the length of one frame so that the third film switch swFLM3 remains OFF. If the camera is made automatically switched to the rewind mode even under such conditions, the photographer would mistake the execution of the rewinding operation as that the shutter has opened and closed. So he would later have an erroneous management. Also, because the mirror is held in the non-viewing position, when the lens is pointed toward a very intense light source, the film will be fogged. For this reason, it is recommended to set the mirror down before the film is rewound.

Upon detection of the film end in the timer interruption procedure at a time after the mirror-up has been determined in step 12 and when the completion of the winding is waited in steps 13 and 14, for the flag F0 is set to "1" in step 124, the flow is branched at step 13 to step 67.

Step 67: Change to PD0=0, PD1=1, causing the motor M1 to rotate.

Steps 68-69: Detect the charge end.

Step 70: Change to PD0=1, causing the motor M1 to be braked. Thereupon, the mirror is charged, returning down to the initial position. Then jump back to step 45: RWND, and initialize the rewind procedure.

As has been described above, according to this embodiment, means is provided for controlling the driving of a plurality of motors in such a manner that after the termination of the shutter operation, the motors are supplied with current while its starts are successively displaced, thereby the rush currents of the plurality of motors are prevented from superimposing one upon another. Thus, the drop of the battery voltage due to the rush currents of the plurality of motors can be avoided.

Next, by reference to FIGS. 11 to 14, a second embodiment of the present invention is described. For note, the similar parts to those shown above are denoted by the same reference characters, and the common drawings of the foregoing are omitted.

Figure 11:
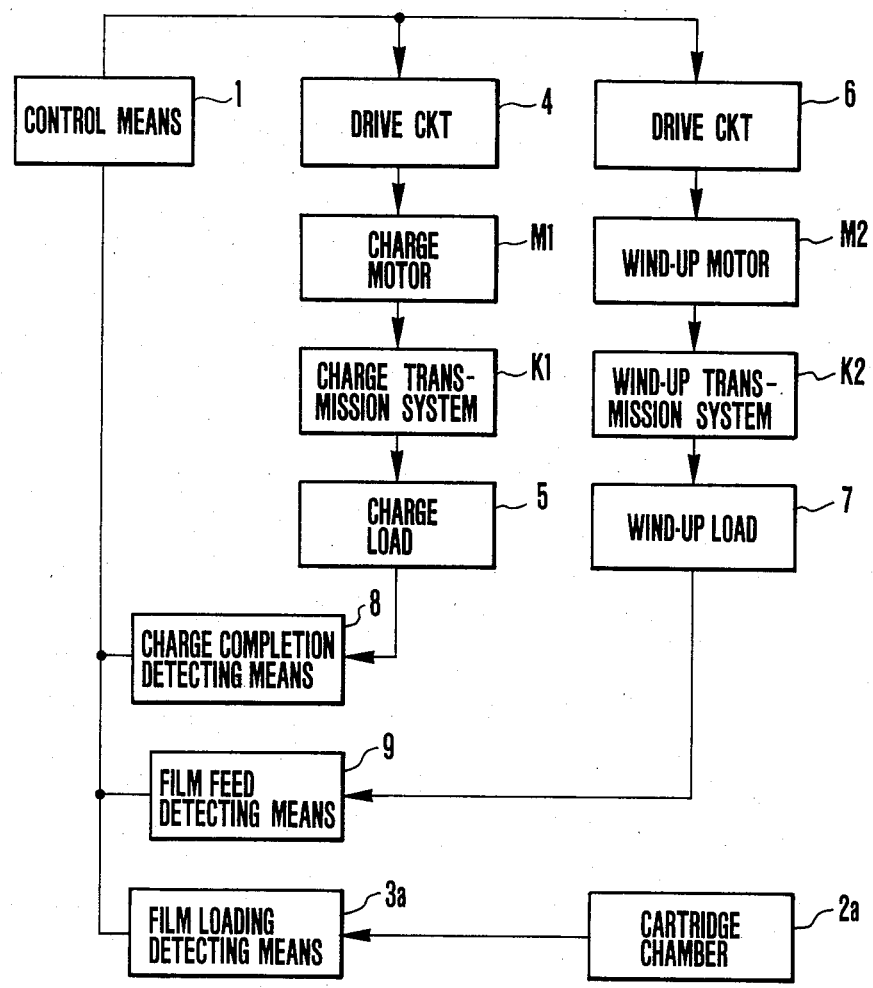
FIG. 11 is a block diagram illustrating a second embodiment of the invention.

FIG. 11 illustrates the fundamental structure of the second embodiment of the invention.

When the exposure of one frame of film has been completed, control means 1 comprising, for example, a microcomputer, renders a drive circuit 4 operative, causing a charge motor M1 to rotate. Thereby through a charge transmission system K1 is charged a charge load 5 necessary to be charged such as a shutter mechanism, diaphragm control mechanism, mirror mechanism and lens drive mechanism. At the same time, another drive circuit 6 is rendred operative, causing a wind-up motor M2 to be driven. Rotation of the wind-up motor M2 is transmitted through a wind-up transmission system to a load 7 (including film), thereby the film is wound up.

Charge completion detecting means 8 detects when the various portions of the camera are all charged. Responsive to this detection signal, the control means 1 controls the stoppage of the charge motor M1 and so on.

Film feed detecting means 9 senses motion of the film and detects when the winding is in progress, or near completion, or in completion. Responsive to this detection signal, the control means 1 controls the deceleration and stoppage of the wind-up motor M2. For note, the film may be rewound by another or rewind motor, or the wind-up motor M2 may be used also for rewinding the film.

When a cartridge chamber 2a of the camera contains no film cartridge, film loading detecting means 3a provided in the cartridge chamber 2a detects this either mechanically, or optically, or magnetically. This detection signal is then applied to the control means 1. Thereby the control means 1 renders only the drive circuit 4 operative, leaving the drive circuit 6 inoperative. Therefore, the charge motor M1 only is energized, while the wind-up motor M2 is hindered from energization.

According to this embodiment, when to make blank shots without film in the camera for checking its operation or for demonstration in shops, because the wind-up motor M2 and the wind-up transmission system K2 do not rotate, wasteful consumption of electrical power can be saved, and fruitless lowering of the durability of the wind-up motor M2 and wind-up transmission system K2 can be avoided. For note, because the charging of the charge load 5 takes place, the release operation is not hindered. So, blank shooting can be carried out as desired.

For note, this embodiment employs the common front and top views of the camera, and common charge, wind-up and rewind transmission systems of the above-described first embodiment shown in FIGS. 2 to 6.

Figure 12:
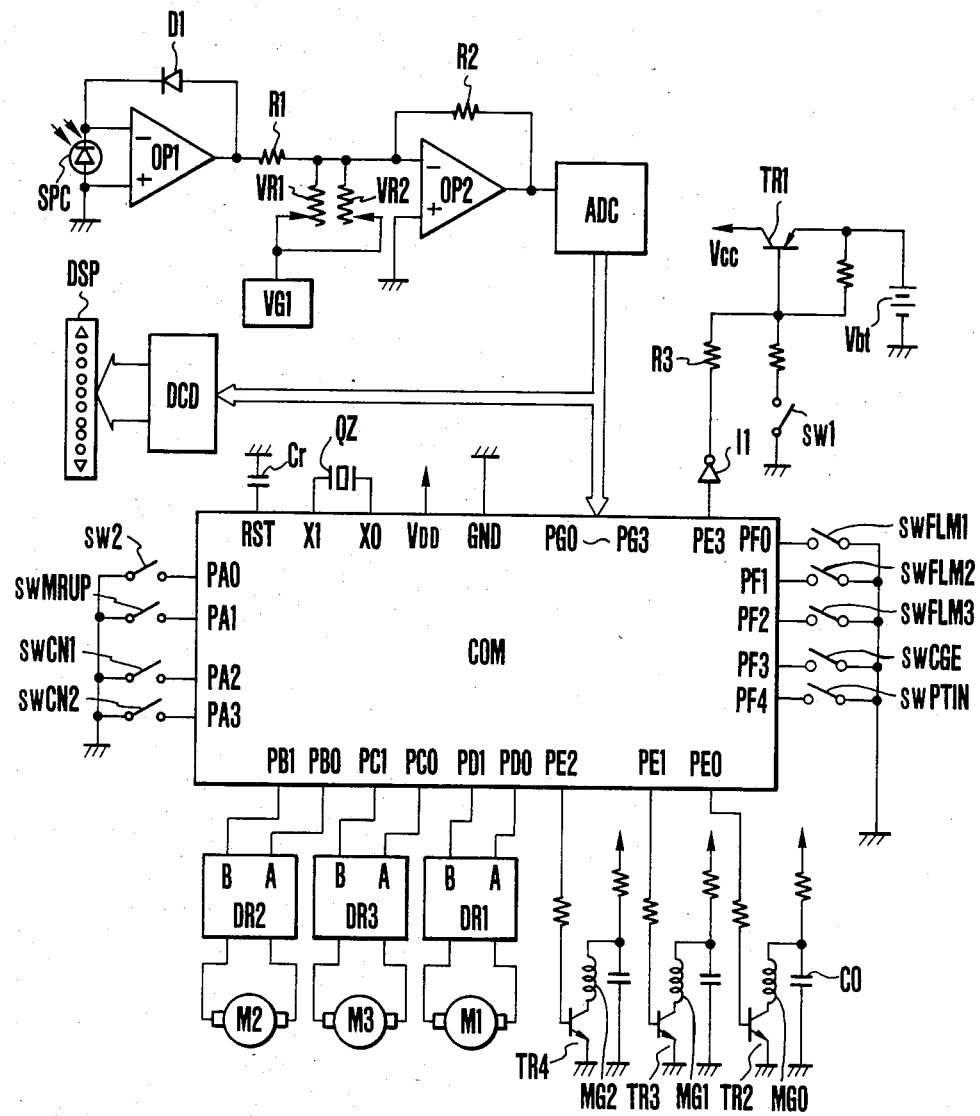
FIG. 12 is an electrical circuit diagram of a microcomputer and peripheral circuits as the second embodiment.

FIG. 12 illustrates a practical example of an electrical circuit in which as the control means 1 use is made of a microcomputer COM. For note, in the following description by reference to FIG. 12, the similar parts to those of the first embodiment shown in FIG. 7 are denoted by the same reference characters and their explanation is omitted.

What is characteristic of the second embodiment is that an input port PF4 of the microcomputer COM is connected to the output of a switch swPTIN arranged in the cartridge chamber 310 (see FIG. 6) to turn on when a film cartridge is inserted thereto, and to turn off when it is removed therefrom.

Figure 13A:
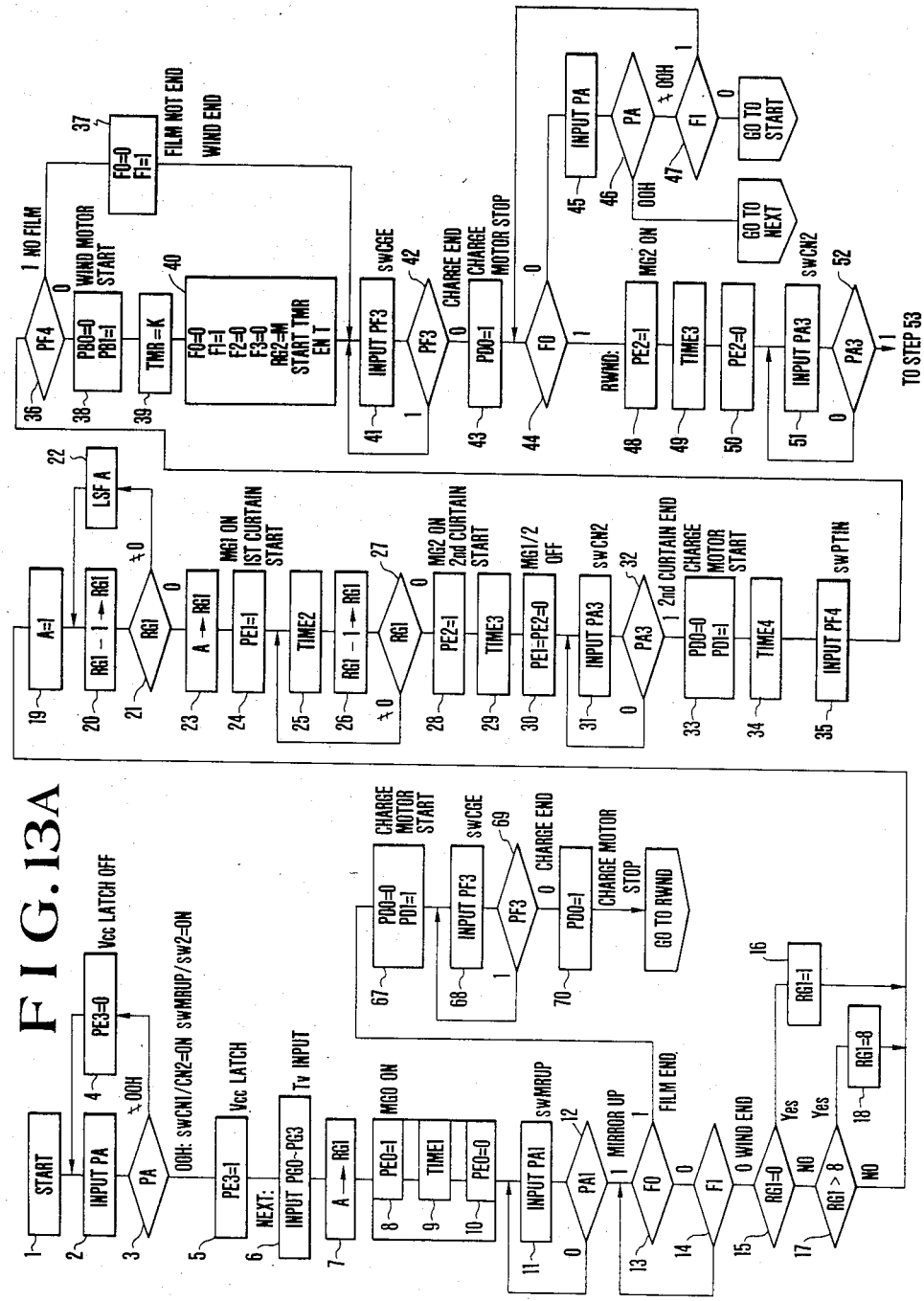
FIG. 13A, 13B and 14 are flow charts of the second embodiment.
Figure 13B:
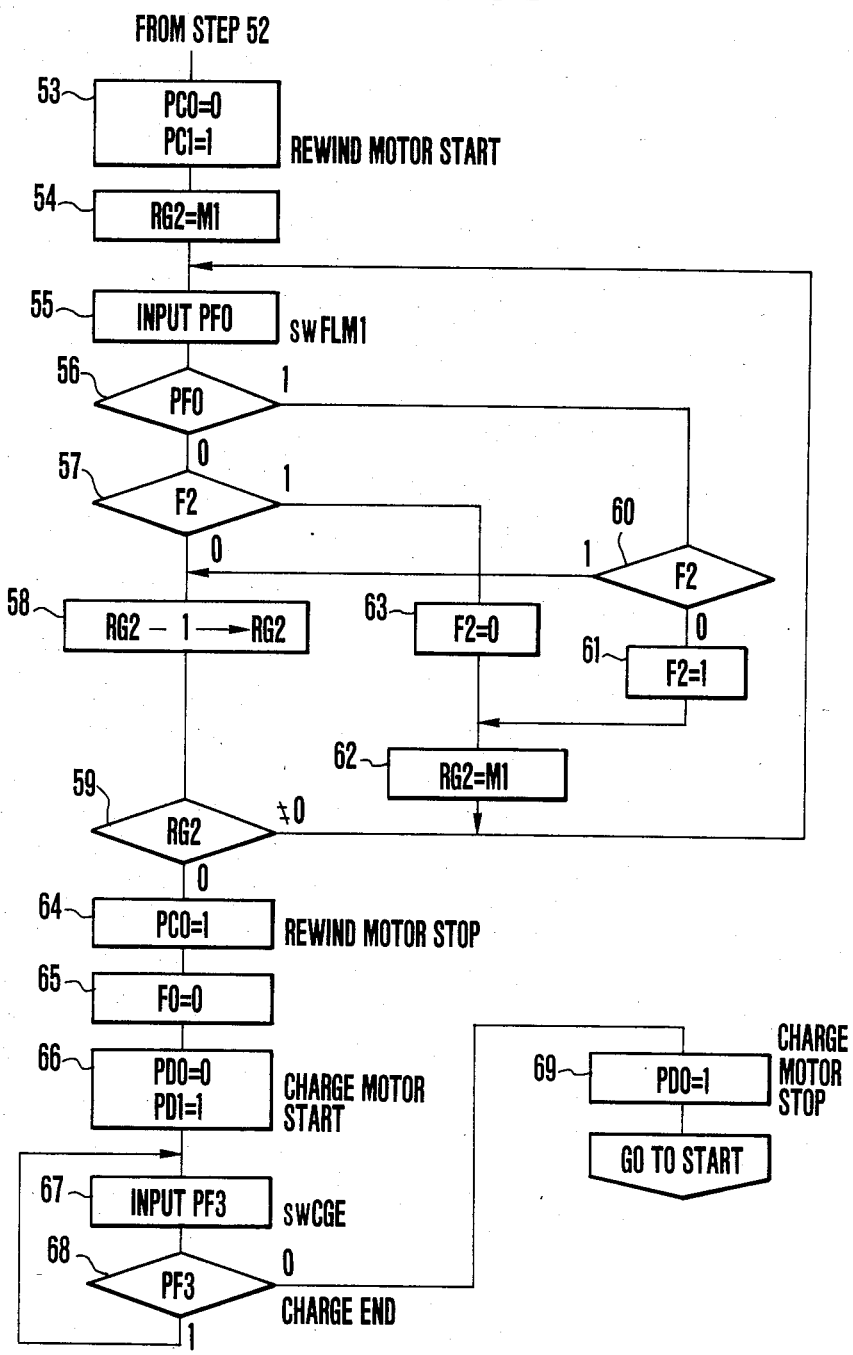
Figure 14:
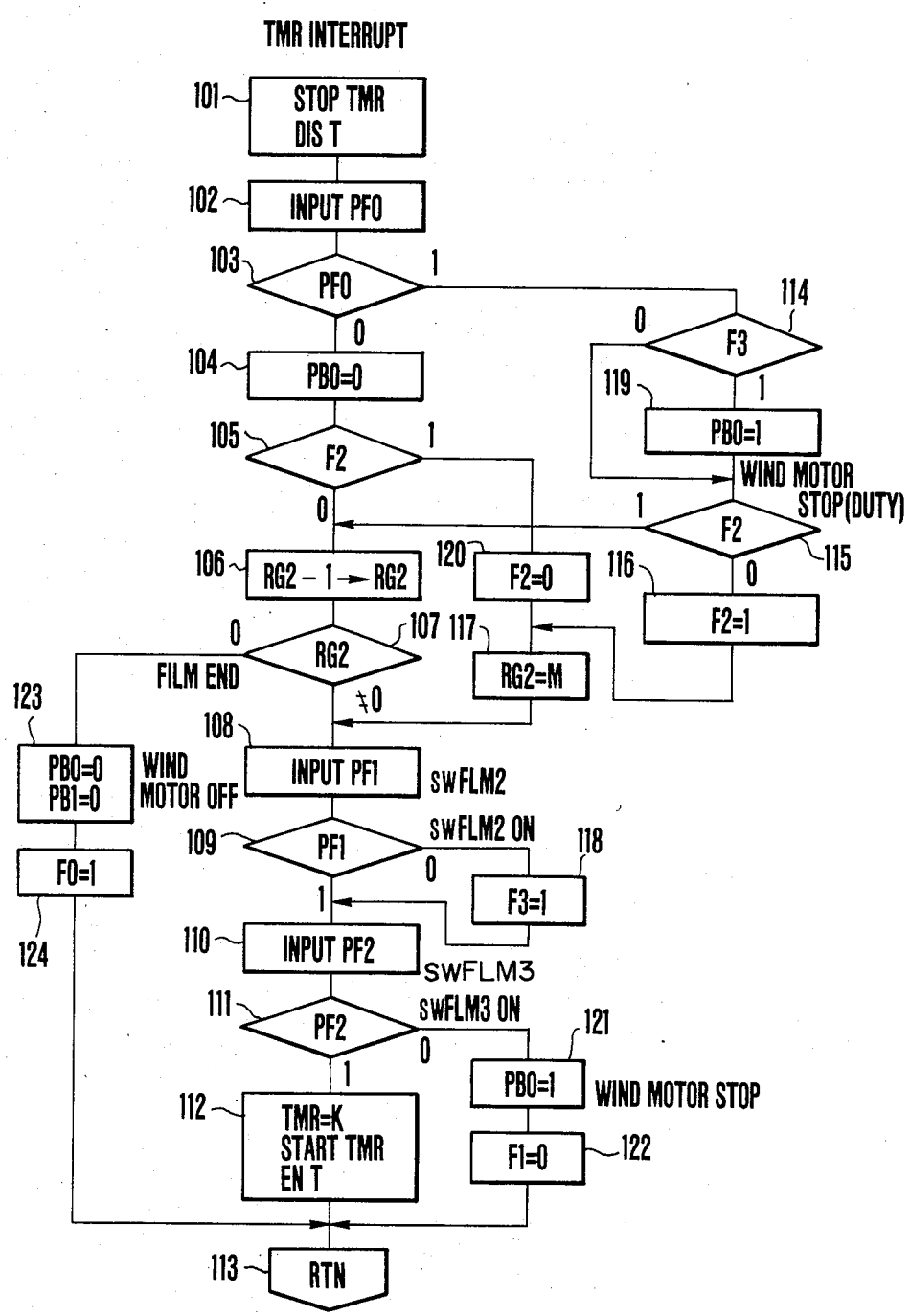

Next, the operation of the microcomputer COM of FIG. 12 is explained by reference to the flow chart of FIGS. 13A, 13B and 14.

Step 1: By the supply of the battery voltage Vcc in response to closure of the first stroke dependent switch sw1, the microcomputer COM is started to operate. A train of clock pulses from the quartz oscillator QZ are received, and at the same time, a power-on reset is executed by the capacitor Cr. A built-in program counter is initialized to No. 0 address, causing program execution to begin with the block labeled "START". Here, all the flags are assumed to have "0" and all the output ports also to have "0Step 2: Inputs from the ports PA0 to PA3 (hereinafter referred to as "PA" inputs, and this holds for the other ports) are received. If all the portions of the camera are in their charged positions, then when the photographer further pushes down the release button to the second stroke, PA0=PA1=PA2=PA3=0 result. decimal number system.

Step 3: If the PA inputs are [00H], jump to step 5. If not, advance to step 4.

Step 4: Now assuming that the PA inputs are not [00H], then the PE3 output is changed to "0"Since, at the time of the power-on reset, all the output ports are "0", this command is meaningless. But because the program has a loop to step 1, it is at this time that it has meaning. (Latch release of the battery voltage Vcc).

Step 5: When the PA inputs are [00H], or when the photographer pushes the release button to the second stroke, procedure to exposure mode is executed. The PE3 output becomes "1", sustaining the ON state of the transistor TR1 to latch the voltage Vcc.

Step 6: The APEX value Tv of shutter time in the form of a 4-bit digital value from the A/D converter ADC is introduced. Since the number of bits is four, the possible decimal numbers are "0" through "15".

Step 7: Since the PG inputs of step 6 are stored in an accumulator A, this value is transferred to an internal register RG1.

Step 8: The PE0 output is changed to "1", causing the transistor TR2 turn on so that the capacitor C0 which has so far been charged to almost equal a voltage to the battery voltage Vcc is suddenly discharged to the first latch control solenoid MG0. Thereby, a mechanical release is actuated.

Step 9: The flow is waited for a certain time by a timer. A program for this purpose is, for example, to put a certain value into the accumulator A, and then subtract one by one from that value until A=0. The time necessary to do this may be used as the wating time. The program procedure is not shown because the flow chart would become very complicated. For note, TIME2 to TIME4 have similar programs.

Step 10: The PE0 output is then changed to "0∞, thereby the current supply to the first latch control solenoid MG0 is cut off. TIME1 may be determined to be slightly longer than the minimum time for which the first latch control solenoid MG0 is energized. After that, the mechanical sequence of operation goes on so that the diaphragm is closed down to the presetting, and the mirror is moved upward.

Step 11: The PA1 input representing the movement of the mirror is taken up. In a certain time from the release of the mirror from the latching connection by MG0, the mirror should reach the terminal end of movement.

Step 12: A routine for waiting the mirror until it reaches the non-viewing position. When this position is reached, step 13 is executed. This routine is provided for ascertaining that the mirror is moved away completely from the light path to the exposure aperture, before the shutter is opened.

Step 13: The flag F0 is examined. F0=1 represents the film end.

Step 14: The flag F1 is examined. F1=0 represents the termination of each cycle of film winding operation.

Step 15: Whether or not the value of the internal register RG1 is "0" is examined. As has been described above, when the computed shutter time is shorter than 1/1000 sec., the PG inputs take "0000", or RG1=1.

Step 16: If RG1=0, it is forced to RG1, or the shutter time is fixed to 1/1000 sec.

Step 17: Whether or not RG1>8, or the shutter time is longer than ⅛ sec. is examined.

Step 18: If RG1>8, it is forced to RG1=8, or the shutter time is fixed to ⅛ sec.

Step 19: The accumulator A is incremented by "1". Routines in steps 19 to 22 are to convert the value of the internal register RG1 representing the sutter time to elongate as multiplied by 2 in sequence.

Step 20: "1" is subtracted from the value of the internal register RG1, and then put again into it.

Step 21: Whether or not RG1=0 is examined. If it is "0", jump to step 23. If not, advance to step 22.

Step 22: The content of the accumulator A is shifted to the left, or doubled. On assumption that the accumulator A has 8 bits, then when, for example, RG1=8, the content of the accumulator A is shifted 7 times. Since the initial content of the accumulator A was [00000001], it, therefore, becomes [10000000].

Step 23: The content of the accumulator A is transferred to the internal register RG1. Thus, the shutter time is elongated in multiplied-by-2 serial fashion.

Step 24: The PE1 output is changed to "1", causing the leading curtain control solenoid MG1 to be supplied with current. The leading curtain starts running.

Step 25: A waiting time is formed by a constant time timer.

Step 26: The content of the internal register RG1 is reduced by "1".

Step 27: The steps 25 to 27 are repeated until the content of the internal register RG1 becomes "0". In this step, an actual time of the shutter time is counted.

Step 28: The PE2 output is changed to "1", causing the trailing curtain control solenoid MG2 to be supplied with currrent. The trailing curtain runs donw, terminating the operaton of the focal plane shutter.

Step 29: A time necessary for the trailing curtain to travel across the film gate is formed by a constant time timer.

Step 30: Reset to PE1=PE2=0. So the leading and trailing curtain control solenoids MG1 and MG2 are deenergized.

Step 31: An input from the trailing curtain sensor switch swCN2 is taken up.

Step 32: A routine for waiting swCN2 to open or waiting up for the completion of the running down of the trailing curtain. When it has run down, advance to step 33.

Step 33: PD0=1, PD1=1 render the drive circuit DR1 operative. The charge motor M1 starts to rotate. Thereby, the shutter, mirror and automatic diaphragm are charged.

Step 34: Wait for a time from the start of current supply to the motor M1 to start energization of te wind-up motor M2, until the current flowing through the winding of the motor M1 becomes stable. Thereby, the rush currents in the initial stages of operation of the motors M1 and M2 are prevented from superimposing one upon another.

Step 35: Input PF4 representing whether or not the cartridge chamber 310 contains a film cartridge 24.

Step 36: If the film cartridge 24 is absent, advance to step 37. If present, jump to step 38. This is a normal routine.

Step 37: Because the film cartridge 24 is absent, set flag F0=0, assuming that the film is not in the end. Also, set F1=0, assuming that the film winding is completed. Then, jump to step 41. This routine is that, since there is no film cartridge 24 in the chamber, for, as the film winding itself is meaningless, the driving control of the wind-up motor is interrupted, and the driving of the charge motor M1 only is controlled.

Step 38: PB0=0, PB1=1 render the drive circuit DR2 operative. The motor M2 starts to rotate. Thereby the film is wound up.

Step 39: Set a constant K in a timer TMR for timer inter ruption. K is taken at a value depending on the winding-up speed of the film, the number of equally divided parts of the pulse disc P1 (FIG. 5) of the first film switch swFLM1, and the period of instruction cycle of the microcomputer COM.

Step 40: Start the timer TMR for timer interruption. Enable the timer interruption (EN T). Input a constant M into the internal register RG2. Set the flags F0=F2=F3=0, F1=1. The flag F2 represents the ON or OFF state of the first film switch swFLM1, and the flag F3 represents the ON or OFF state of the second film switch swFLM2. The timer TMR since started is decremented repeatedly independently of the main program routine. For every prescribed time (dependent on the constant K), interruption is effected with jump from the executed program to a specific timer interruption address. Here, the timer interruption procedure is explained by reference to FIG. 14.

Timer Interruption Procedure

Step 101: Prohibit decrement and interruption of timer TMR.

Step 102: Input PF0 from the first film switch swFLM1.

Step 103: If PF0=0, advance to step 104. If PF0=1, jump to step 114.

Step 104: Because PB0 remains the same as that set in step 35, the current supply to the wind-up motor continues.

Step 105: Test flag F2. Beause F2 has been set in step 37, advance to step 106.

Step 106: Decrease the content of the internal register RG2 by "1".

Step 107: Test RG2=0. Since, in the up-to-present program, RG2=M−1, for, as M is somewhat large a value, it does not become "0", advance to step 108.

Step 108: Input PF1 from the second film switch swFLM2.

Step 109: Test PF1=0. If the film is not being advanced just before the terminal end of length of one frame yet, PF1=1. So, advance to step 110.

Step 110: Input PF2 from 3rd film switch swFLM3.

Step 111: Test PF2=0. If the cycle of film winding operation is not completed yet, PF2=1. So advance to step 112.

Step 112: Set the constant K in the timer register again, causing the timer TMR to start so that interruption is enabled.

Step 113: Return to the original program under execution. The timer interruption subroutine is to turn away from the program under execution to going for testing the states of the three film switches swFLM1, swFLM2 and swFLM3 in every certain time. Since the program itself goes with the instructions each of which is executed at a very high speed, the recycling of the input of film winding up information in the certain period does not actually give rise to a problem.

Now assuming that a certain cycle of execution of the timer interruption subroutine is encountered with opening of the first film switch swFLM1, then jump from step 103 to step 114.

Step 114: Test flag F3=1. Since F3=0 has been set in step 37, advance to step 115.

Step 115: Test flag F2=1. Since F2=0 has been set in step 37, advance to step 116.

Step 116: Set flag F2 to "1". This means that the first film switch swFLM1 has turned off, in other words, the input PF0 has changed to 1.

Step 117: Set again the internal register RG2 to the constant M. Then, jump to beginning of the aforesaid subroutine with step 108. Here, for a little while, the winding-up is carried out. Suppose a moment just before the terminal end of one-frame movement of the film. Since, at this time, the second film switch swFLM2 turns on, PF1=0 appears, causing step 109 to be followed by step 118.

Step 118: Set flag F3 to "1". In the subsequent cycle of execution of the timer interruption subroutine, therefore, a jump to step 119 occurs at step 114.

Step 119: Set PB0=1. Since PB1=1 has been set in step 37, the wind-up motor M2 is deenergized, and, at the same time, braked. But inertia does not allow the motor M2 to stop immediately. So it continues rotating. By the subsequent cycle of execution of the timer interruption subroutine, as the first film switch swFLM1 changes from OFF to ON, step 103 is followed not by step 114, but by step 104. Since PB0=0 takes place again, the motor M2 is energized for the second time. Since, at this time, F2=1 as has already been set in step 116, advance to step 120.

Step 120: Set flag F2 to "0", and then jump back to step 117 where the constant M is set in the internal register RG2. In conclusion, after the second film switch swFLM2 turns on, that is, the winding up nears completion, as the ON-and-OFF operation of the first film switch swFLM1 recycles, the motor M2 is put under duty control to repeat driving-braking-driving-braking and so on. Thus, it is being decelerated.

When the cycle of film winding operation has completed, the third film switch swFLM3 is turned on. So, a jump from step 111 to step 121 takes place.

Step 121: Brake the motor M2 as in step 119.

Step 122: Set flag F1 to 0, which represents the termination of the film winding operation. Then, jump back to step 113 where the subroutine transits to the original program. Because step 112 is not in the path, no more interruption occurs.

Next assuming that the used film is of 24-exposure length, and the 24th frame has just been exposed, then energization of the motor M2 will only result in tension of the film. So, the first film switch swFLM1 can no longer turn on and off, causing the flag F2 to be left unchanged from "0" or "1". In step 106, therefore, the content of the internal register RG2 is subtracted by 1 in each cycle of execution of the timer interruption subroutine. When RG2=0 is reached in some cycle number, a jump from step 107 to step 123 takes place.

Step 123: Set PB0=PB1=0, causing both ends of the winding of the motor M2 to open.

Step 124: Set flag F0=0, which represents the film end.

The above-described loop beginning with the step 40 of the main routine is executed always until the next shot goes to step 15. Thus, the film winding operation is controlled accurately.

We now proceed to explain the remain of the main program routine.

Step 41: Input a signal representing that the shutter, mirror and automatic diaphragm have been charged from the charge switch swCGE.

Step 42: A routine comprised together with step 41 for waiting until the charging is completed. Of course, during this time, a necessary number of cycles of timer interruption procedure are carried out.

Step 43: Change PD0 output to 1, causing the charge motor M1 to be braked.

Step 44: Test the flag F0 which represents the film end. Now suppose the film is not all exposed, then advance to step 45.

Step 45: Similar to step 2.

Step 46: If the photographer continues pushing the release button with intension of shooting in the continuous run mode, the second-stroke dependent switch sw2 remains ON, so that the PA inputs have a hexadecimal number of [00H], causing a jump back to step 6: NEXT.

With the step 6, as has been described above, the photographing sequence begins. It should be pointed out here that without making determination of when the film winding operation is terminated, step 8 is executed to activate the first latch control solenoid MG0. In fact, the preparation for an exposure or the adjustment of the diaphragm to the presetting and the upward movement of the mirror, is carried out regardless of whether or not the film winding operation in the preceding shot is terminated, thereby giving an advantage that the firing rate of shots is increased. After that, the termination of upward movement of the mirror is determined in step 12, and the termination of the film winding operation is determined in step 14. Until now, the timer interrupting is repeated any number of times. Upon detection of the termination of the film winding operation, advance to the next step for shutter control.

Next explanation is given to the single frame shooting mode. Since, after each shot, the photographer must have continued pushing the release button in the second stroke, step 46 is followed by step 47. Step 47: Test the completion of the winding by the timer interruption procedure, or F1=0. If not, repeat steps 44 to 47. Upon completion of the winding, jump back to step 1: START. In step 4, the battery voltage Vcc is then released from the latching. If the first stroke dependent switch sw1 also is OFF, the supply of the voltage Vcc is cut off.

Rewind Procedure

When the film is tensioned at an intermediate point during the winding operation, the execution of the timer interruption subroutine results in F0=1, causing the flow to be branched from step 44 to step 48.

Steps 48-50: Energize solenoid MG2 for a certain time, causing the trailing curtain to run down as in steps 28 to 30. This is because the film is protected against fogging when it happens that the photographer while having carelessly taken the lens off the camera body and been exposing the shutter to strong light, carries out the rewinding. Since both of the leading and trailing curtains are present in front of the exposure aperture, the strong light can be shut out perfectly from the film surface.

Step 51: Input a signal from the trailing curtain sensing switch swCN2.

Step 52: Wait for the completion of running down of the trailing curtain. Upon completion, then advance to step 53.

Step 53: Set PC0=0, PC1=1, causing the rewind motor M3 to rotate.

Step 54: Set the internal register RG2 to M1.

Steps 55-63: Determine when the film leader comes across the drive sprocket 29a. This program for detecting the stoppage of the sprocket 29a from further rotation is similar to the film motion detecting program described in connection with the steps 102, 103, 105, 106, 107, 115, 116, 117 and 120 of the timer interruption procedure. Upon completion of the rewinding. Then advance to step 64.

Step 64: Change to PC0=1, causing the rewind motor M3 to stop.

Step 65: Reset flag F0 to "0" which represents the film end.

Step 66: Set PD0=0, PD1=1, causing energization of the charge motor M1. This is because the trailing curtain ran down in step 48 to prepare for the rewinding, for the shutter mechanism is charged.

Step 67: Input a signal from the charge switch swCGE.

Step 68: Wait for the completion of the charging before an advance to step 69.

Step 69: Stop the motor M1. Thus, the rewind procedure all comes to end. Exit this subroutine.

In connection with the continuous shooting mode, we should consider a particular situation where the charging of the shutter, mirror and automatic diaphragm terminates so far earlier than the termination of the film winding operation that after the first latch control solenoid MG0 has been energized to actuate the next camera release, the film is tensioned, as the film end comes up.

In this situation, though the diaphragm has been closed down and the mirror has been moved upward in response to energization of the solenoid MG0, the film gets stopped from further movement to the length of one frame so that the third film switch swFLM3 remains OFF. If the camera is made automatically switched to the rewind mode even under such conditions, the photographer would mistake the execution of the rewinding operation as that the shutter has opened and closed. So he would later have an erroneous management. Also, because the mirror is held in the non-viewing position, when the lens is pointed toward a very intense light source, the film will be fogged. For this reason, it is recommended to set the mirror down before the film is rewound.

Upon detection of the film end in the timer interruption procedure at a time after the mirror-up has been determined in step 12 and when the completion of the winding is waited in steps 13 and 14, for the flag F0 is set to "1" in step 124, the flow is branched at step 13 to step 70.

Step 70: Change to PD0=0, PD1=1, W causing the motor M1 to rotate.

Steps 71–72: Detect the charge end.

Step 73: Change to PD0=1, causing the motor M1 to be braked. Thereupon, the mirror is charged, returning down to the initial position. Then jump back to step 48: RWND, and initialize the rewind procedure.

As has been described above, according to the second embodiment, control means is proved so that when the camera is not loaded with film, the driving control of the wind-up motor that follows the termination of the release operation is discontinued, while driving the charge motor only, thereby giving an advantage that the wasteful consumption of electrical power by the wind-up motor can be saved, and the fruitless lowering of the durability of the wind-up motor and wind-up transmission system can be avoided.

Next, a third embodiment of the invention is described by reference to FIGS. 15 to 18. For note, the similar parts to those of the first embodiment are denoted by the same reference characters, and the common drawings with the first embodiment are moitted.

Figure 15:
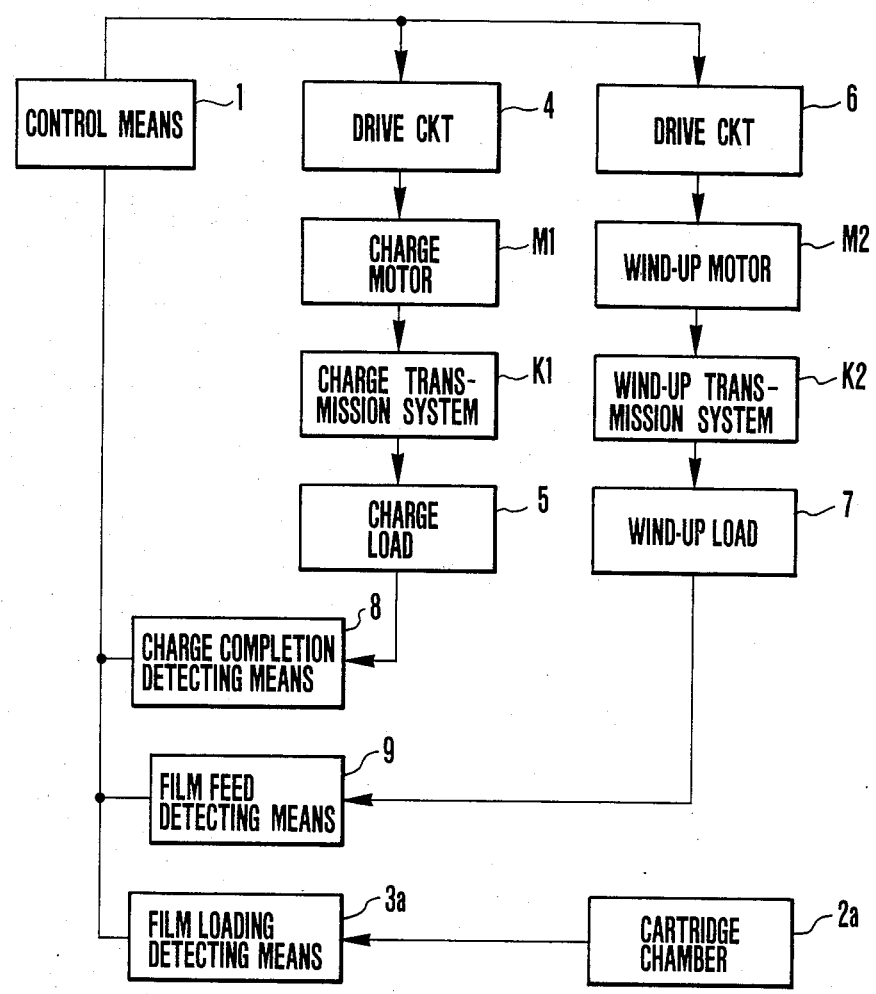
FIG. 15 is a block diagram illustrating a third embodiment of the invention.

FIG. 15 illustrates the fundamental structure of the third embodiment of the invention.

When the exposure of one frame of film has been completed, control means 1 comprising, for example, a microcomputer, renders a drive circuit 4 operative, causing a charge motor M1 to rotate. Thereby through a charge transmission system K1 is charged a charge load 5 necessary to be charged such as a shutter mechanism, diaphragm control mechanism, mirror mechanism and lens drive mechanism. At the same time, another drive circuit 6 is rendred operative, causing a wind-up motor M2 to be driven. Rotation of the wind-up motor M2 is transmitted through a wind-up transmission system to a load 7 (including film), thereby the film is wound up.

Charge completion detecting means 8 detects when the various portions of the camera are all charged. Responsive to this detection signal, the control means 1 controls the stoppage of the charge motor M1 and so on.

Film feed detecting means 9 senses motion of the film and detects when the winding is in progress, or near completion, or in completion. Responsive to this detection signal, the control means 1 controls the deceleration and stoppage of the wind-up motor M2. For note, the film may be rewound by another or rewind motor, or the wind-up motor M2 may be used also for rewinding the film.

When the cartridge chamber 2a of the camera contains no film cartridge, the film presence detecting means 3a provided in the cartridge chamber 2a detects it mechanically, or optically or magnetically. This detection signal is applied to the control means 1. Responsive to this, the control means 1 renders the drive circuits 4 and 6 operative, causing them to drive the charge motor M1 and wind-up motor M2. As all the various portions of the camera have been charged, when the control means 1 receives the signal from the charge completion detecting means 8, it causes the driving of the charge motor M1 and wind-up motor M2 to stop. Therefore, it is possible to stop the wind-up motor M2 even when the film feed detecting means 9 produces no signal.

According to this embodiment, when to make blank shots without loading the camera, either for checking the operations, or for demonstration in shops, the wind-up motor M2 can be rotated. So, its operation can be checked.

For note, this embodiment employs the common front and top views of the camera and the common charge, wind-up and rewind transmission systems with those of the above-described first embodiment shown in FIGS. 2 to 6.

Figure 16:
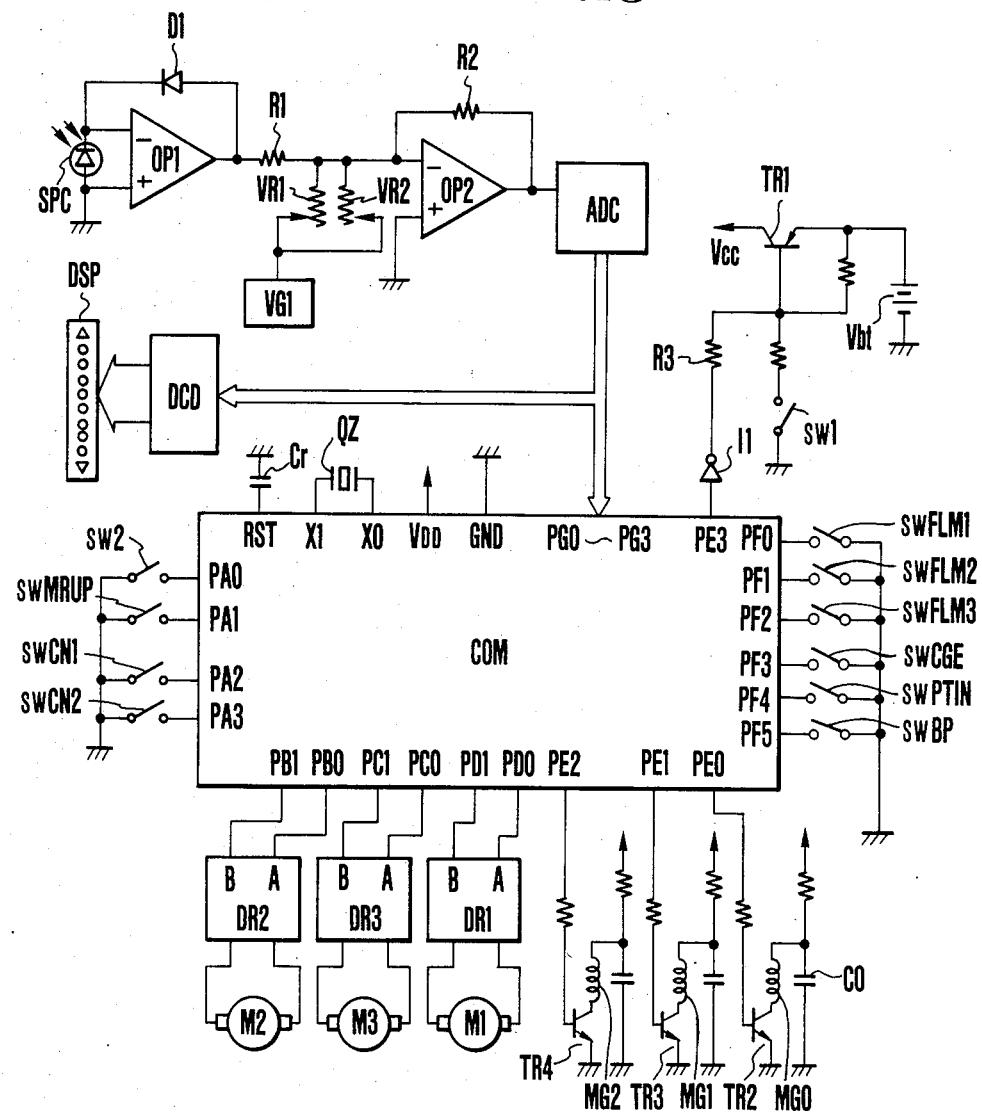
FIG. 16 is an electrical circuit diagram of a microcomputer and peripheral circuits as the third embodiment.

FIG. 16 illustrates a practical example of the electrical circuit in which as the control means 1 use is made of a microcomputer COM. For note, in the description by reference to FIG. 16, the common parts of the above-described first embodiment in reference to FIG. 7 are denoted by using the same reference characters and their explanation is omitted.

What is characteristic of the third embodiment is that an input port PF4 of the microcomputer COM is connected to the output of a switch swPTIN arranged in the cartridge chamber 310 (see FIG. 6) to turn on when a film cartridge is inserted into and to turn off when it is removed therefrom, and that another input port PF5 is connected to the output of a switch swBP arranged to turn on or off when the back cover of the camera is opened or closed.

Next, the operation of the microcomputer COM of FIG. 16 is described by reference to the flow chart of FIGS. 17A to 17C and 18.

Step 1: By the supply of the battery voltage Vcc in response to closure of the first stroke dependent switch sw1, the microcomputer COM is started to operate. A train of clock pulses from the quartz oscillator QZ are received, and at the same time, a power-on reset is executed by the capacitor Cr. A built-in program counter is initialized to No. 0 address, causing program execution to begin with the block labeled "START". Here, all the flags are assumed to have "0" and all the output ports also to have "0".

Step 2: Inputs from the ports PA0 to PA3 (hereinafter referred to as "PA" inputs, and this holds for the other ports) are received. If all the portions of the camera are in their charged positions, then when the photographer further pushes down the release button to the second stroke, PA0=PA1=PA2=PA3=0 result. Thus the PA inputs have a value of [00H] in the hexadecimal number system.

Step 3: If the PA inputs are [00H], jump to step 5. If not, advance to step 4.

Step 4: Now assuming that the PA inputs are not [00H], then the PE3 output is changed to "0". Since, at the time of the power-on reset, all the output ports are "0", this command is meaningless. But because the program has a loop to step 1, it is at this time that it has meaning. (Latch release of the battery voltage Vcc).

Step 5: When the PA inputs are [00H], or when the photographer pushes the release button to the second stroke, procedure to exposure mode is executed. The PE3 output becomes "1", sustaining the ON state of the transistor TR1 to latch the voltage Vcc.

Step 6: The APEX value Tv of shutter time in the form of a 4-bit digital value from the A/D converter ADC is introduced. Since the number of bits is four, the possible decimal numbers are "0" through "15".

Step 7: Since the PG inputs of step 6 are stored in an accumulator A, this value is transferred to an internal register RG1.

Step 8: The PE0 output is changed to "1", causing the transistor TR2 turn on so that the capacitor C0 which has so far been charged to almost equal a voltage to the battery voltage Vcc is suddenly discharged to the first latch control solenoid MG0. Thereby, a mechanical release is actuated.

Step 9: The flow is waited for a certain time by a timer. A program for this purpose is, for example, to put a certain value into the accumulator A, and then subtract one by one from that value until A=0. The time necessary to do this may be used as the waiting time. The program procedure is not shown because the flow chart would become very complicated. For note, TIME2 to TIME4 have similar programs.

Step 1-0: The PE0 output is then changed to "0", thereby the current supply to the first latch control solenoid MG0 is cut off. TIME1 may be determined to be slighly longer than the minimum time for which the first latch control solenoid MG0 is energized. After that, the mechanical sequence of operation goes on so that the diaphragm is closed down to the presetting, and the mirror is moved upward.

Step 11: The PA1 input representing the movement of the mirror is taken up. In a certain time from the release of the mirror from the latching connection by MG0, the mirror should reach the terminal end of movement.

Step 12: A routine for waiting the mirror until it reaches the non-viewing position When this position is reached, step 13 is executed. This routine is provided for ascertaining that the mirror is moved away completely from the light path to the exposure aperture, before the shutter is opened.

Step 13: The flag F0 is examined. F0=1 represents the film end.

Step 14: The flag F1 is examined. F1=0 represents the termination of each cycle of film winding operation.

Step 15: Whether or not the value of the internal register RG1 is "0" is examined. As has been described above, when the computed shutter time is shorter than 1/1000 sec., the PG inputs take "0000", or RG1=1.

Step 16: If RG1=0, it is forced to RG1, or the shutter time is fixed to 1/1000 sec.

Step 17: Whether or not RG1>8, or the shutter time is longer than ⅛ sec. is examined.

Step 18: If RG1>8, it is forced to RG1=8, or the shutter time is fixed to ⅛ sec.

Step 19: The accumulator A is incremented by "1". Routines in steps 19 to 22 are to convert the value of the internal register RG1 representing the sutter time to elongate as multiplied by 2 in sequence.

Step 20: "1" is subtracted from the value of the internal register RG1, and then put again into it.

Step 21: Whether or not RG1=0 is examined. If it is "0", jump to step 23. If not, advance to step 22.

Step 22: The content of the accumulator A is shifted to the left, or doubled. On assumption that the accumulator A has 8 bits, then when, for example, RG1=8, the content of the accumulator A is shifted 7 times. Since the initial content of the accumulator A was [00000001], it, therefore, becomes [10000000].

Step 23: The content of the accumulator A is transferred to the internal register RG1. Thus, the shutter time is elongated in multiplied-by-2 serial fashion.

Step 24: The PE1 output is changed to "1", causing the leading curtain control solenoid MG1 to be supplied with current. The leading curtain starts running.

Step 25: A waiting time is formed by a constant time timer.

Step 26: The content of the internal register RG1 is reduced by "1".

Step 27: The steps 25 to 27 are repeated until the content of the internal register RG1 becomes "0". In this step, an actual time of the shutter time is counted.

Step 28: The PE2 output is changed to "1", causing the trailing curtain control solenoid MG2 to be supplied with current. The trailing curtain runs down, terminating the operation of the focal plane shutter.

Step 29: A time necessary for the trailing curtain to travel across the film gate is formed by a constant time timer.

Step 30: Reset to PE1=PE2 32 0. So the leading and trailing curtain control solenoids MG1 and MG2 are deenergized.

Step 31: An input from the trailing curtain sensor switch swCN2 is taken up.

Step 32: A routine for waiting swCN2 to open or waiting up for the completion of the running down of the trailing curtain. When it has run down, advance to step 33.

Step 33: PD0=1, PD1=1 render the drive circuit DR1 operative. The charge motor M1 starts to rotate. Thereby, the shutter, mirror and automatic diaphragm are charged.

Step 34: Wait for a time from the start of current supply to the motor M1 to start energization of tee wind-up motor M2, until the current flowing through the winding of the motor M1 becomes stable. Thereby, the rush currents in the initial stages of operation of the motors M1 and M2 are prevented from superimposing one upon another.

Step 35: Input PF4 representing whether or not the cartridge chamber 310 contains a film cartridge 24.

Step 36: If the film cartridge 24 is absent, jump to step 201. If present, advance to step 37. This is a normal routine.

Figure 17B:
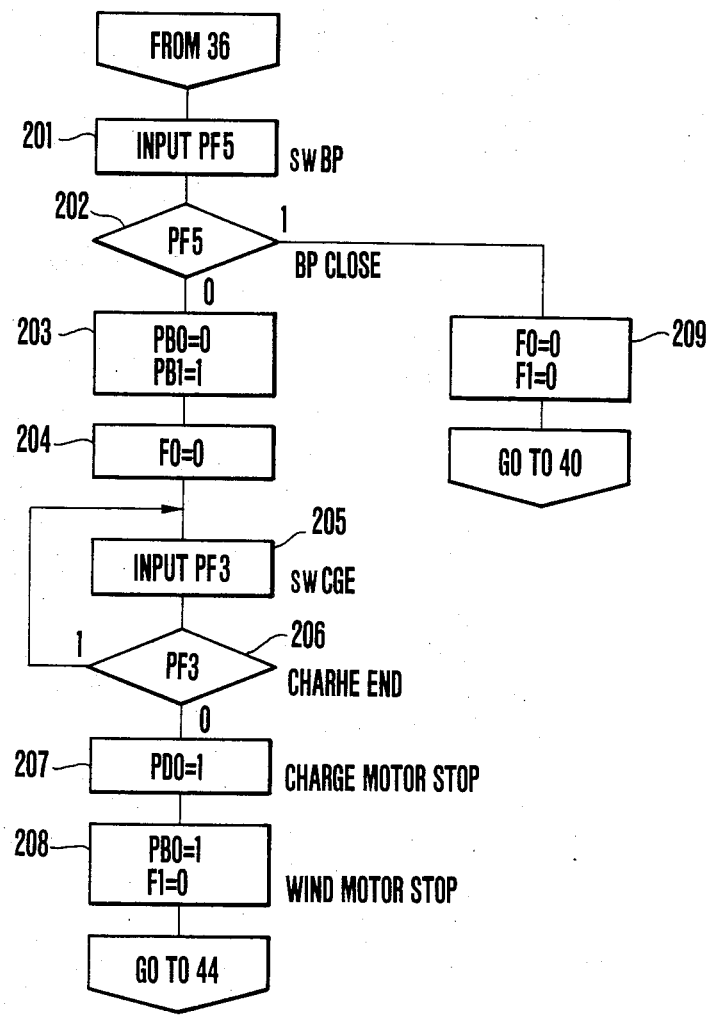
Figure 17C:
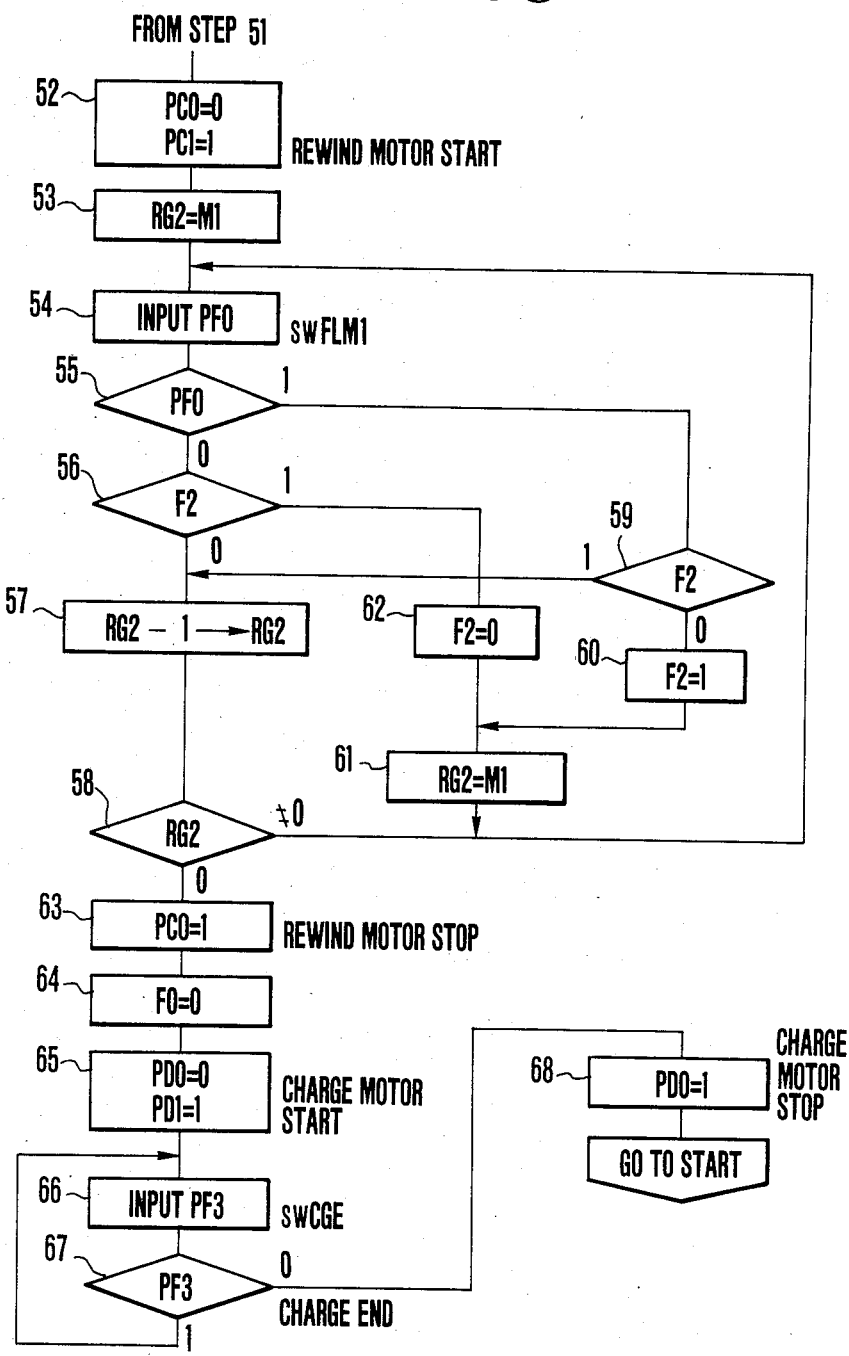
Figure 18:
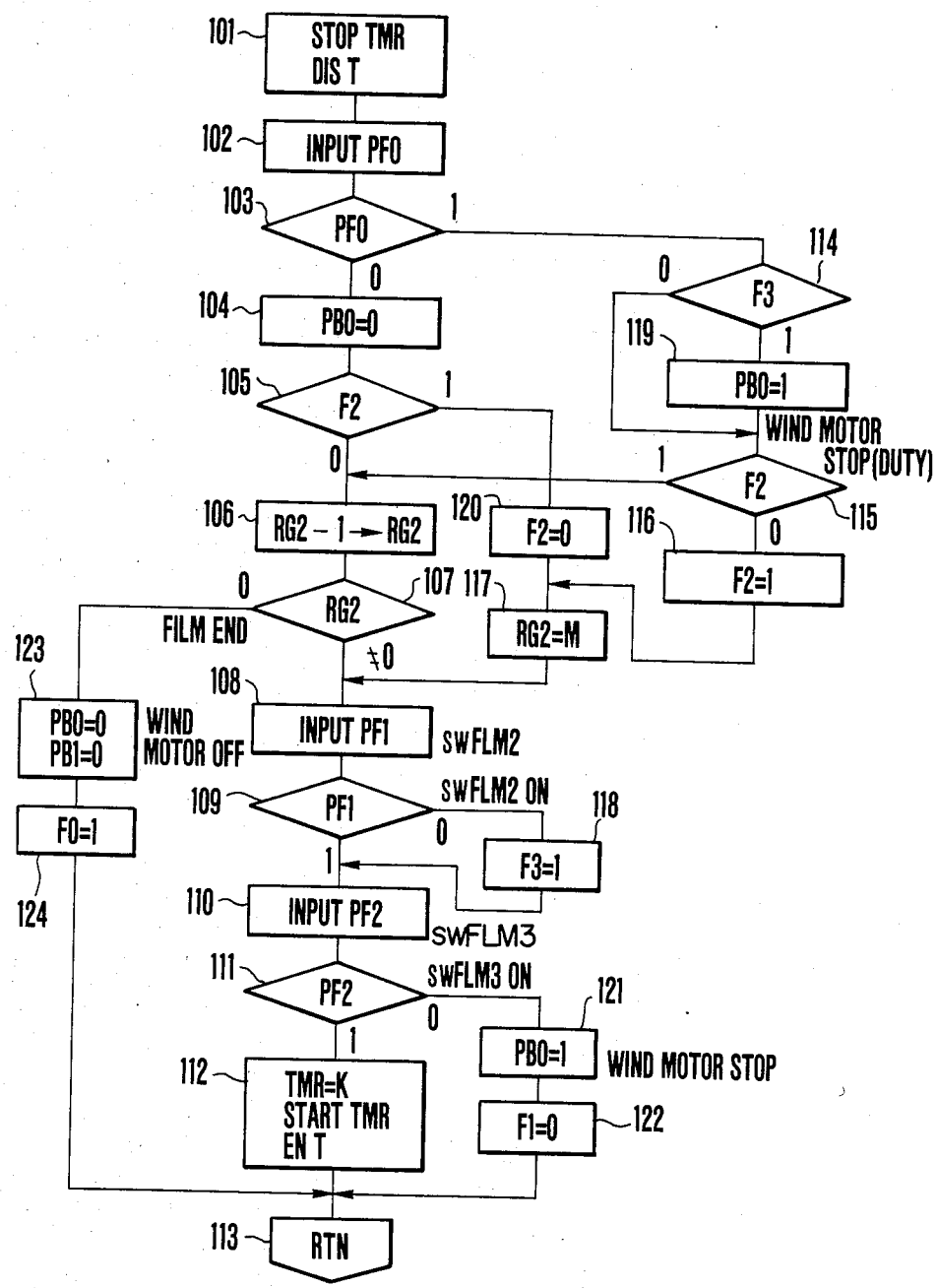

The case that the film cartridge 24 is absent in the chamber 310 is first explained by reference to FIG. 17B.

Step 201: Input PF5 representing the signal from the back cover operated switch swBP.

Step 202: Test the PF5 input. If the back cover is open, advance to step 203. If it is closed, jump to step 209.

Step 203: Set PB0=0, PB1=1, causing the wind-up motor M2 to rotate. Since the back cover is open, the photographer can see that the drive sprocket 29a and the spool 22 are rotating. This is advantageous at checking or demonstration. Also, the mistake for malfunction can be avoided.

Step 204: Since the film cartridge 24 is absent, set flag F0=0. That is, it is taken as the film not in the end.

Step 205: Input signal representing that the shutter, the mirror and the automatic diaphragm have been charged from the charge switch swCGE.

Step 206: This step constitutes a routine for waiting until the completion of the charging together with step 205. step 207: Charge PD0 output to "1". Thereby the charged motor M1 is braked.

Step 208: Change the PB0 output to "1" in sequence to the stoppage of driving of the charge motor M1. Thereby the wind-up motor M2 is braked. That is, the completion of the charging controls determination of when the driving of the wind-up motor M2 should be stopped. In the normal routine, the braking of the wind-up motor M2 is controlled in accordance with the signal from the third film switch swFLM3. In this case, however, because the film is absent, the signal from the third film switch swFLM3 does not change, making it impossible for the normal routine to control the braking. Also, set flag F1 to "0" W which represents the completion of the winding-up. After that, jump back to step 44.

Step 209: If the back cover is closed, the flow is branched from step 202 to step 209. Because the film cartridge 24 is absent, set flag F0=0, assuming that the film winding up is not completed. Then, jump back to step 40. This routine is that, for, as the film cartridge 24 is absent, the film winding up itself is meaningless at all, the driving control of the wind-up motor M2 is discontinued, and the charge motor M1 is only allowed to be driven, thereby the wasteful consumption of electrical power by the driving of the wind-up motor M2 is avoided. For note, it may be otherwise made possible that at any time when the film cartridge 24 is absent, the driving of the charge motor M1 concurs with the driving of the wind-up motor M2. For this purpose, it is only necessary to jump from step 36 to step 203.

Let us now return to the normal routine for the presence of the film cartridge 24.

Step 37: PB0=0, PB1=1 render the drive circuit DR2 operative. The motor M2 starts to rotate. Thereby the film is wound up.

Step 38: Set a constant K in a timer TMR for timer interruption. K is taken at a value depending on the winding-up speed of the film, the number of equally divided parts of the pulse disc P1 (FIG. 5) of the first film switch swFLM1, and the period of instruction cycle of the microcomputer COM.

Step 39: Start the timer TMR for timer interruption. Enable the timer interruption (EN T). Input a constant M into the internal register RG2. Set the flags F0=F2=F3=0, F1=1. The flag F2 represents the ON or OFF state of the first film switch swFLM1, and the flag F3 represents the ON or OFF state of the second film switch swFLM2. The timer TMR since started is decremented repeatedly independently of the main program routine. For every prescribed time (dependent on the constant K), interruption is effected with jump from the executed program to a specific timer interruption address. Here, the timer interruption procedure is explained by reference to FIG. 18.

Timer Interruption Procedure:

Step 101: Prohibit decrement and interruption of timer TMR.

Step 102: Input PF0 from the first film switch swFLM1.

Step 103: If PF0=0, advance to step 104. If PF0=1, jump to step 114.

Step 104: Because PB0 remains the same as that set in step 35, the current supply to the wind-up motor continues.

Step 105: Test flag F2. Because F2 has been set in step 37, advance to step 106.

Step 106: Decrease the content of the internal register RG2 by "1".

Step 107: Test RG2=0. Since, in the up-to-present program, RG2=M−1, for, as M is somewhat large a value, it does not become "0", advance to step 108.

Step 108: Input PF1 from the second film switch swFLM2.

Step 109: Test PF1=0. If the film is not being advanced just before the terminal end of length of one frame yet, PF1=1. So, advance to step 110.

Step 110: Input PF2 from 3rd film switch swFLM3.

Step 111: Test PF2=0. If the cycle of film winding operation is not completed yet, PF2=1. So advance to step 112.

Step 112: Set the constant K in the timer register again, causing the timer TMR to start so that interruption is enabled. Step 113: Return to the original program under execution. The timer interruption subroutine is to turn away from the program under execution to going for testing the states of the three film switches swFLM1, swFLM2 and swFLM3 in every certain time. Since the program itself goes with the instructions each of which is executed at a very high speed, the recycling of the input of film winding up information in the certain period does not actually give rise to a problem.

Now assuming that a certain cycle of execution of the timer interruption subroutine is encountered with opening of the first film switch swFLM1, then jump from step 103 to step 114.

Step 114: Test flag F3=1. Since F3=0 has been set in step 37, advance to step 115.

Step 115: Test flag F2=1. Since F2=0 has been set in step 37, advance to step 116.

Step 116: Set flag F2 to "1". This means that the first film switch swFLM1 has turned off, in other words, the input PF0 has changed to 1.

Step 117: Set again the internal register RG2 to the constant M. Then, jump to beginning of the aforesaid subroutine with step 108. Here, for a little while, the winding-up is carried out. Suppose a moment just before the terminal end of one-frame movement of the film. Since, at this time, the second film switch swFLM2 turns on, PF1=0 appears, causing step 109 to be followed by step 118.

Step 118: Set flag F3 to "1". In the subsequent cycle of execution of the timer interruption subroutine, therefore, a jump to step 119 occurs at step 114.

Step 119: Set PB0=1. Since PB1=1 has been set in step 37, the wind-up motor M2 is deenergized, and, at the same time, braked. But inertia does not allow the motor M2 to stop immediately. So it continues rotating. By the subsequent cycle of execution of the timer interruption subroutine, as the first film switch swFLM1 changes from OFF to ON, step 103 is followed not by step 114, but by step 104. Since PB0=0 takes place again, the motor M2 is energized for the second time. Since, at this time, F2=1 as has already been set in step 116, advance to step 120.

Step 120: Set flag F2 to "0", and then jump back to step 117 where the constant M is set in the internal register RG2. In conclusion, after the second film switch swFLM2 turns on, that is, the winding up nears completion, as the ON-and-OFF operation of the first film switch swFLM1 recycles, the motor M2 is put under duty control to repeat driving-braking-driving-braking and so on. Thus, it is being decelerated.

When the cycle of film winding operation has completed, the third film switch swFLM3 is turned on. So, a jump from step 111 to step 121 takes place.

Step 121: Brake the motor M2 as in step 119.

Step 122: Set flag F1 to 0 which represents the termination of the film winding operation. Then, jump back to step 113 where the subroutine transits to the original program. Because step 112 is not in the path, no more interruption occurs.

Next assuming that the used film is of 24-exposure length, and the 24th frame has just been exposed, then energization of the motor M2 will only result in tension of the film. So, the first film switch swFLM1 can no longer turn on and off, causing the flag F2 to be left unchanged from "0" or "1". In step 106, therefore, the content of the internal register RG2 is subtracted by 1 in each cycle of execution of the timer interruption subroutine. When RG2=0 is reached in some cycle number, a jump from step 107 to step 123 takes place.

Step 123: Set PB0=PB1=0, causing both ends of the winding of the motor M2 to open.

Step 124: Set flag F0=0, which represents the film end.

The above-described loop beginning with the step 39 of the main routine is executed always until the next shot goes to step 15. Thus, the film winding operation is controlled accurately.

We now proceed to explain the remain of the main program routine.

Step 40: Input a signal representing that the shutter, mirror and automatic diaphragm have been charged from the charge switch swCGE.

Step 41: A routine comprised together with step 40 for waiting until the charging is completed. Of course, during this time, a necessary number of cycles of timer interruption procedure are carried out.

Step 42: Change PD0 output to 1, causing the charge motor M1 to be braked.

Step 43: Test the flag F0 which represents the film end. Now suppose the film is not all exposed, then advance to step 44.

Step 44: Similar to step 2.

Step 45: If the photographer continues pushing the release button with intension of shooting in the continuous run mode, the second-stroke dependent switch sw2 remains ON, so that the PA inputs have a hexadecimal number of [00H], causing a jump back to step 6: NEXT.

With the step 6, as has been described above, the photographing sequence begins. It should be pointed out here that without making determination of when the film winding operation is terminated, step 8 is executed to activate the first latch control solenoid MG0. In fact, the preparation for an exposure or the adjustment of the diaphragm to the presetting and the upward movement of the mirror, is carried out regardless of whether or not the film winding operation in the preceding shot is terminated, thereby giving an advantage that the firing rate of shots is increased. After that, the termination of upward movement of the mirror is determined in step 12, and the termination of the film winding operation is determined in step 14. Until now, the timer interrupting is repeated any number of times. Upon detection of the termination of the film winding operation, advance to the next step for shutter control.

Next explanation is given to the single frame shooting mode. Since, after each shot, the photographer must have continued pushing the release button in the second stroke, step 45 is followed by step 46. Step 46: Test the completion of the winding by the timer interruption procedure, or F1=0. If not, repeat steps 43 to 46. Upon completion of the winding, jump back to step 1: START. In step 4, the battery voltage Vcc is then released from the latching. If the first stroke dependent switch sw1 also is OFF, the supply of the voltage Vcc is cut off.

Rewind Procedure

When the film is tensioned at an intermediate point during the winding operation, the execution of the timer interruption subroutine results in F0=1, causing the flow to be branched from step 43 to step 47.

Steps 47–49: Energize solenoid MG2 for a certain time, causing the trailing curtain to run down as in steps 28 to 30. This is because the film is protected against fogging when it happens that the photographer while having carelessly taken the lens off the camera body and been exposing the shutter to strong light, carries out the rewinding. Since both of the leading and trailing curtains are present in front of the exposure aperture, the strong light can be shut out perfectly from the film surface.

Step 50: Input a signal from the trailing curtain sensing switch swCN2.

Step 51: Wait for the completion of running down of the trailing curtain. Upon completion, then advance to step 52.

Step 52: Sec PC0=0, PC1=1, causing the rewind motor M3 to rotate.

Step 53: Set the internal register RG2 to M1.

Steps 54–62: Determine when the film leader comes across the drive sprocket 29a. This program for detecting the stoppage of the sprocket 29a from further rotation is similar to the film motion detecting program described in connection with the steps 102, 103, 105, 106, 107, 115, 116, 117 and 120 of the timer interruption procedure. Upon completion of the rewinding. Then advance to step 63.

Step 63: Change to PC0=1, causing the rewind motor M3 to stop.

Step 64: Reset flag F0 to "0" which represents the film end.

Step 65: Set PD0=0, PD1=1, causing energization of the charge motor M1. This is because the trailing curtain ran down in step 47 to prepare for the rewinding, for the shutter mechanism is charged.

Step 66: Input a signal from the charge switch swCGE.

Step 67: Wait for the completion of the charging before an advance to step 68.

Step 68: Stop the motor M1. Thus, the rewind procedure all comes to end. Exit this subroutine.

In connection with the continuous shooting mode, we should consider a particular situation where the charging of the shutter, mirror and automatic diaphragm terminates so far earlier than the termination of the film winding operation that after the first latch control solenoid MG0 has been energized to actuate the next camera release, the film is tensioned, as the film end comes up.

In this situation, though the diaphragm has been closed down and the mirror has been moved upward in response to energization of the solenoid MG0, the film gets stopped from further movement to the length of one frame so that the third film switch swFLM3 remains OFF. If the camera is made automatically switched to the rewind mode even under such conditions, the photographer would mistake the execution of the rewinding operation as that the shutter has opened and closed. So he would later have an erroneous management. Also, because the mirror is held in the non-viewing position, when the lens is pointed toward a very intense light source, the film will be fogged. For this reason, it is recommended to set the mirror down before the film is rewound.

Upon detection of the film end in the timer interruption procedure at a time after the mirror-up has been determined in step 12 and when the completion of the winding is waited in steps 13 and 14, for the flag F0 is set to "1" in step 124, the flow is branched at step 13 to step 69.

Step 69: Change to PD0=0, PD1=1, causing the motor M1 to rotate.

Steps 70-71: Detect the charge end.

Step 72: Change to PD0=1, causing the motor M1 to be braked. Thereupon, the mirror is charged, returning down to the initial position. Then jump back to step 47: RWND, and initialize the rewind procedure.

As has been described above, according to the third embodiment, control means is provided so that when the camera is unloaded, after the termination of the release operation, it is during the time of driving the charge motor that the driving control of the wind-up motor is carried out. Thus, in synchronism with the stoppage of the charge motor, the wind-up motor also made to stop. This makes it possible to check the operation of the wind-up motor even under the condition that the camera is not loaded with film yet.

Next, a fourth embodiment of the invention is described by reference to FIGS. 19 to 22.

The front and top views of the camera, and the charge, wind-up and rewind transmission systems, in this or fourth embodiment are similar to those of the above-described first embodiment shown in FIGS. 2 to 6.

FIG. 19 is a perspective view of the shutter 25 shown in FIG. 3. A charge lever 431 for the shutter unit 25 is moved in a direction indicated by arrow D when it is being charged by the motor M1 of FIG. 2. Current supply to leading and trailing curtain control magnet units 432 and 433 is controlled by a circuit shown in FIG. 20. When they are energized, the leading and trailing curtains of the shutter run down. An exposure aperture 434 is covered by the leading curtain alone when the shutter charging is completed. But soon after the shutter is closed by the trailing curtain, the leading curtain also is moved to cover the exposure aperture 434. Each of the leading and trailing curtains is constructed with a plurality of shutter blades of rectangular shape as shown by 435 to 438. Though there is a possibility of occurrence of slight openings between the successive two shutter blades as they are attracted by static electricity of the rubbed film or pushed by wind when the film is being transported behind the shutter, the film is hardly fogged because the exposure aperture 434 is covered by both of the leading and trailing curtains.

Figure 20:
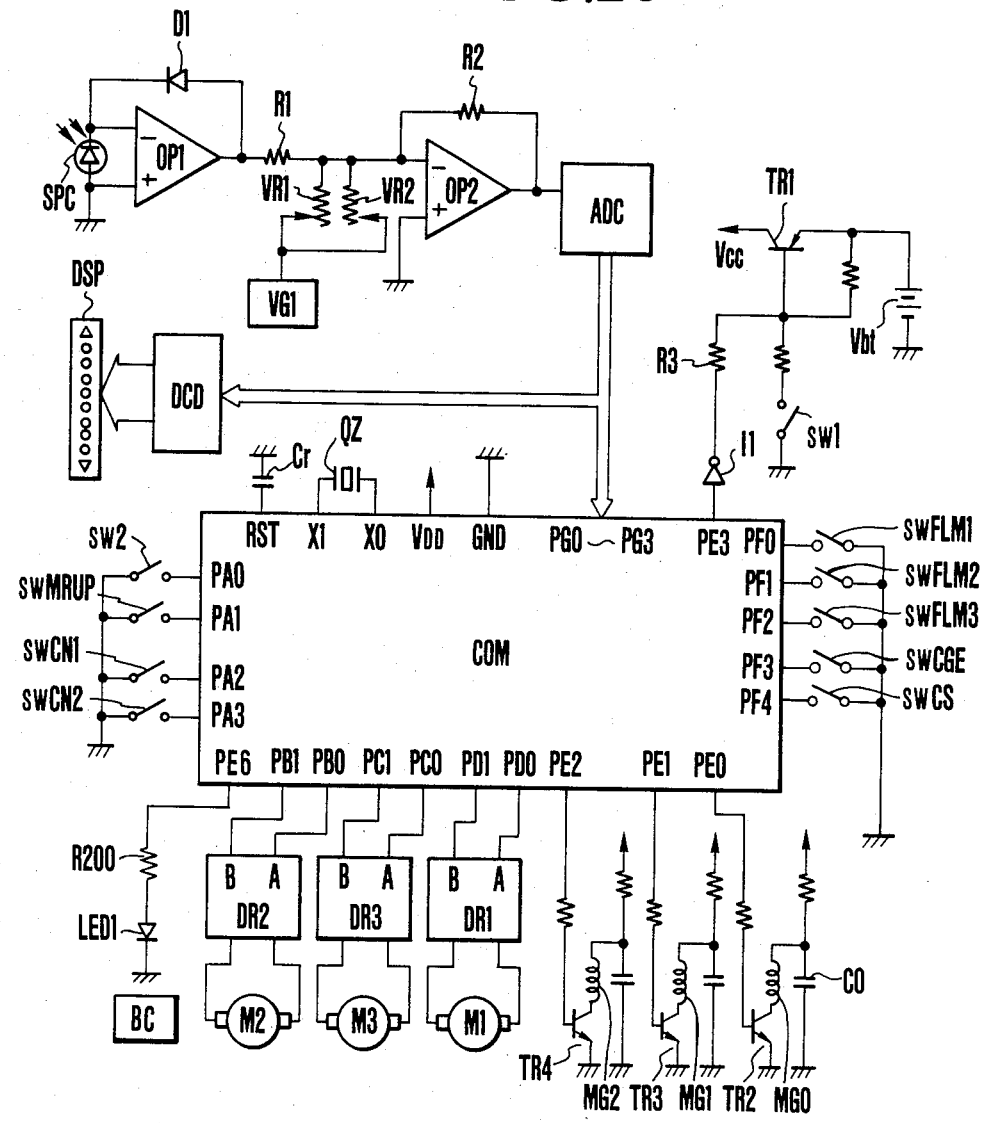
FIG. 20 is an electrical circuit diagram of a microcomputer and peripheral circuits as the fourth embodiment.

FIG. 20 illustrates a practical example of the electrical circuitry in which as the control means use is made of a microcomputer COM. For note, in the description by reference to this or FIG. 20, the common parts with those shown in FIG. 7 in the above-described first embodiment are denoted by the same reference characters and no more explained.

What is characteristic of the fourth embodiment is that an input PF4 of the microcomputer COM is connected to the output of a switch swCS arranged to turn on when the continuous shooting mode is selected, and to turn off when the single frame shooting mode is selected, and that an output port PE6 is connected to a resistor R200 and a light emitting diode LED1.

Figure 21A:
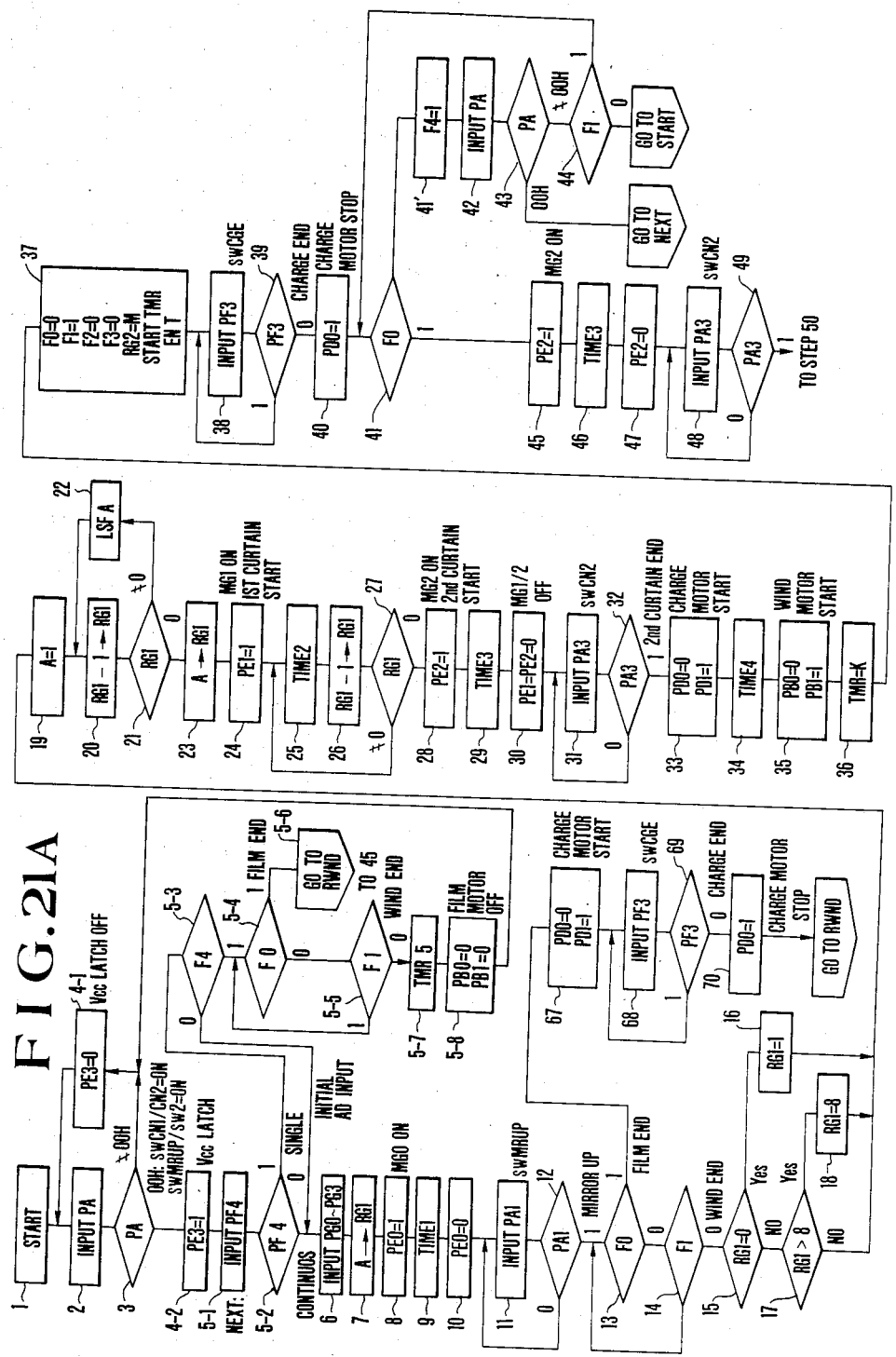
FIGS. 21A, 21B and 22 are flow charts of the fourth embodiment.
Figure 21B:
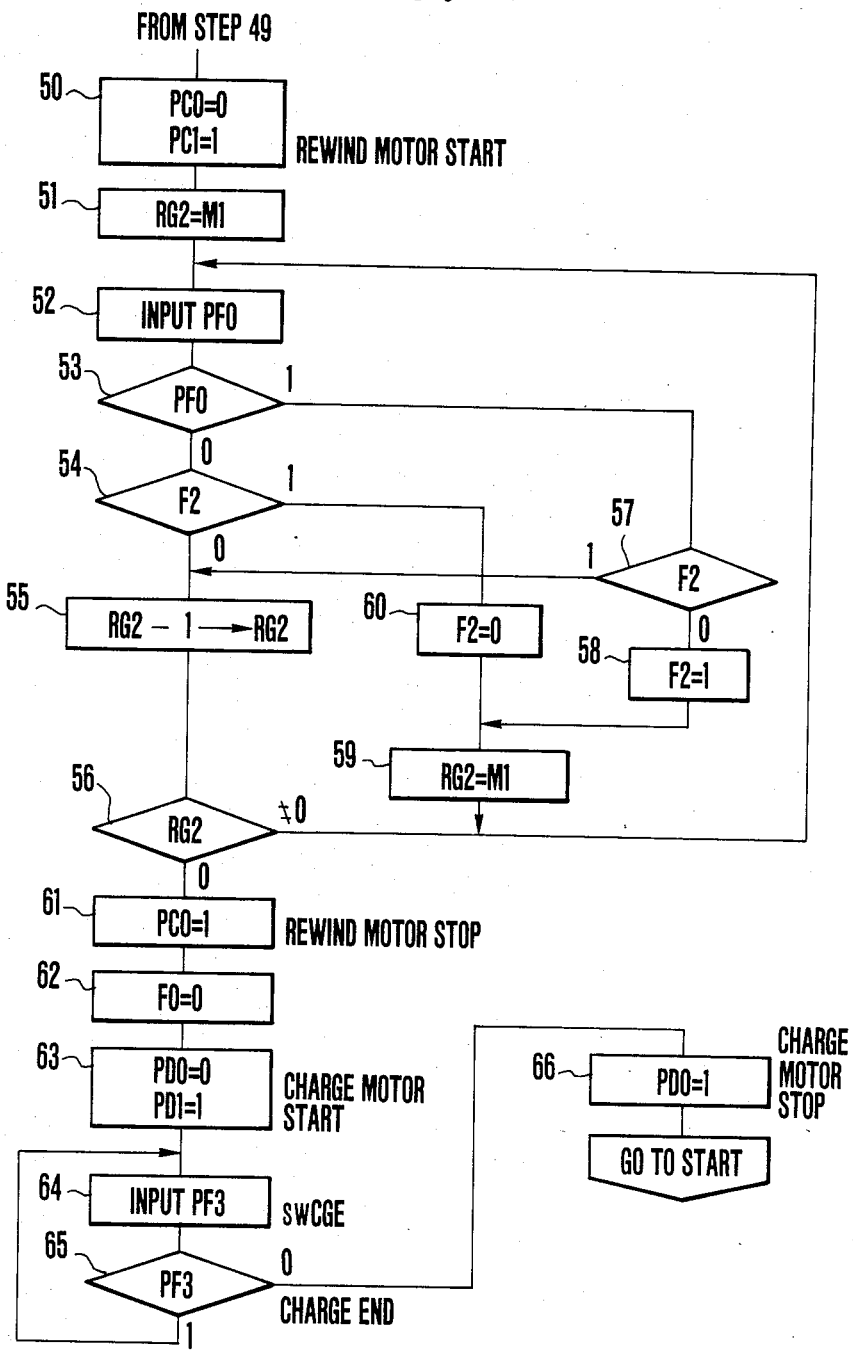

Next, the operation of the microcomputer COM of FIG. 20 is described by reference to the flow chart of FIGS. 21A, 21B and 22.

Step 1: By the supply of the battery voltage Vcc in response to closure of the first stroke dependent switch sw1, the microcomputer COM is started to operate. A train of clock pulses from the quartz oscillator ZQ are received, and at the same time, a power-on reset is executed by the capacitor Cr. A built-in program counter is initialized to No. 0 address, causing program execution to begin with the block labeled "START". Here, all the flags are assumed to have "0" and all the output ports also to have "0".

Step 2: Inputs from the ports PA0 to PA3 (hereinafter referred to as "PA" inputs, and this holds for the other ports) are received. If all the portions of the camera are in their charged positions, then when the photographer further pushes down the release button to the second stroke, PA0=PA1=PA2=PA3=0 result. Thus the PA inputs have a value of [00H] in the hexadecimal number system.

Step 3: If the PA input is [00H], jump to step 4-2. If not, advance to step 4-1.

Step 4-1: Now, if the PA input is not [00H], change the PE3 output to "0". Since all the output ports are "0" at the time of the power-on reset, this command is meaningless. But there is a loop to step 1, it has a meaning for this (The battery voltage Vcc is released from latching).

Step 4-2: When the PA input is [00H], or when the photographer pushes the release button down to the second stroke, the exposure mode is operated. The PE3 output becomes "1", sustaining the transistor TR1 in conducting state and latching the battery voltage Vcc.

Step 5-1; Input PF4. As has been described above, when the single frame shooting mode, the switch swCS is OFF. So, the PF4 input is "1". When in the continuous shooting mode, the switch swCS is ON. So the PF4 input becomes "0".

Step 5-2: Test whether the PF4 input is "1" or "0". For the single frame shooting mode, advance to step 5-3. For the continuous shooting mode, jump to step 6.

Here assuming that the single frame shooting mode is selected, then the following steps 5-3 to 5-8 operate.

Step 5-3: Test flag F4. This flag F4 is set to "1" when one or more shot or shots is or are made in a step 41' to be described later.

At first, as has been described in connection with step 1, it is reset to "0". In the single frame shooting mode, therefore, the first shot causes jump to step 6, and the second shot causes advance to step 5-4. Here also assuming that one shot has already been made in the single frame shooting mode, then step 5-4 is next explained.

Step 5-4: Test flag F0. If the film end is determined by the test, jump to step 45 through step 5-6 of a film rewind control routine RWND. If not, advance to step 5-5. Here also assuming that the film end does not come up yet, then explanation is given to step 5-5.

Step 5-5: Test flag F1 which represents the completion of the winding-up. If the winding-up is in completion, advance to step 5-7. If not, jump back to step 5-4. As will be described more fully in connection with steps 36 and 37 and a flow chart of FIG. 22 to be described later, when the winding-up is halfway, the timer interruption is recycled in a prescribed period, causing jump to step 101 shown in FIG. 22. Therefore, whilst the loop of steps 5-4 and 5-5 is being recycled, when the winding-up is completed, the flag F1 changes to "0", causing advance to step 5-7.

Step 5-7: Wait for a prescribed time by a timer. This time set in the timer TMR5 is determined to be the interval from the moment at which the motor M2 has been short-circuited to the moment at which the motor M2 can actually stop.

Step 5-8: Change both outputs PB0 and PB1 to "0", causing the ends of winding of the motor M2 to open. In the case of the single frame shooting mode, the motor M2 is braked for the time set in step 5-7 from the completion of the winding-up, or from the short-circuiting of both ends of winding of the motor M in step 121 of FIG. 22 to be described later, and then both ends of winding of the motor M2 is opened.

Therefore, an advantage is produced that the base current to the transistors TR32 and TR33 for short-circuiting both ends of winding of the motor M2 is prevented from continuing to flow so that the consumed amount of electrical energy can be minimized. Another advantage is that in the single frame shooting mode, no matter what state may take place when the film winding-up is completed, for example, the switch SW1 may take ON state or the OFF state, it always results that the motor M2 is short-circuited for the preseribed time so that the spaces between the successive two frames in the film can be made almost exactly equal to each other. In more detail, according to the prior art, with the switch SW1 in OFF state at a time when the film winding-up is completed, because the battery latch of the control circuit of the camera is released in response to completion of the film winding-up, it is when the film winding-up is completed that the transistors TR32 and TR33 are turned off to open both ends of winding of the motor M2. So, the amount of rotation of the motor M2 due to inertia increases with increase of the space between the frames. Conversely when the closure of the switch SW1 coincides with the completion of the film winding-up, the space between the frames is decreased. According to the invention, on the other hand, even in the single frame shooting mode, both ends of winding of the motor M2 are short-circuited each time the film winding-up is completed. This makes it possible to equalize the spaces between two of the successive frames to each other.

Figure 22:
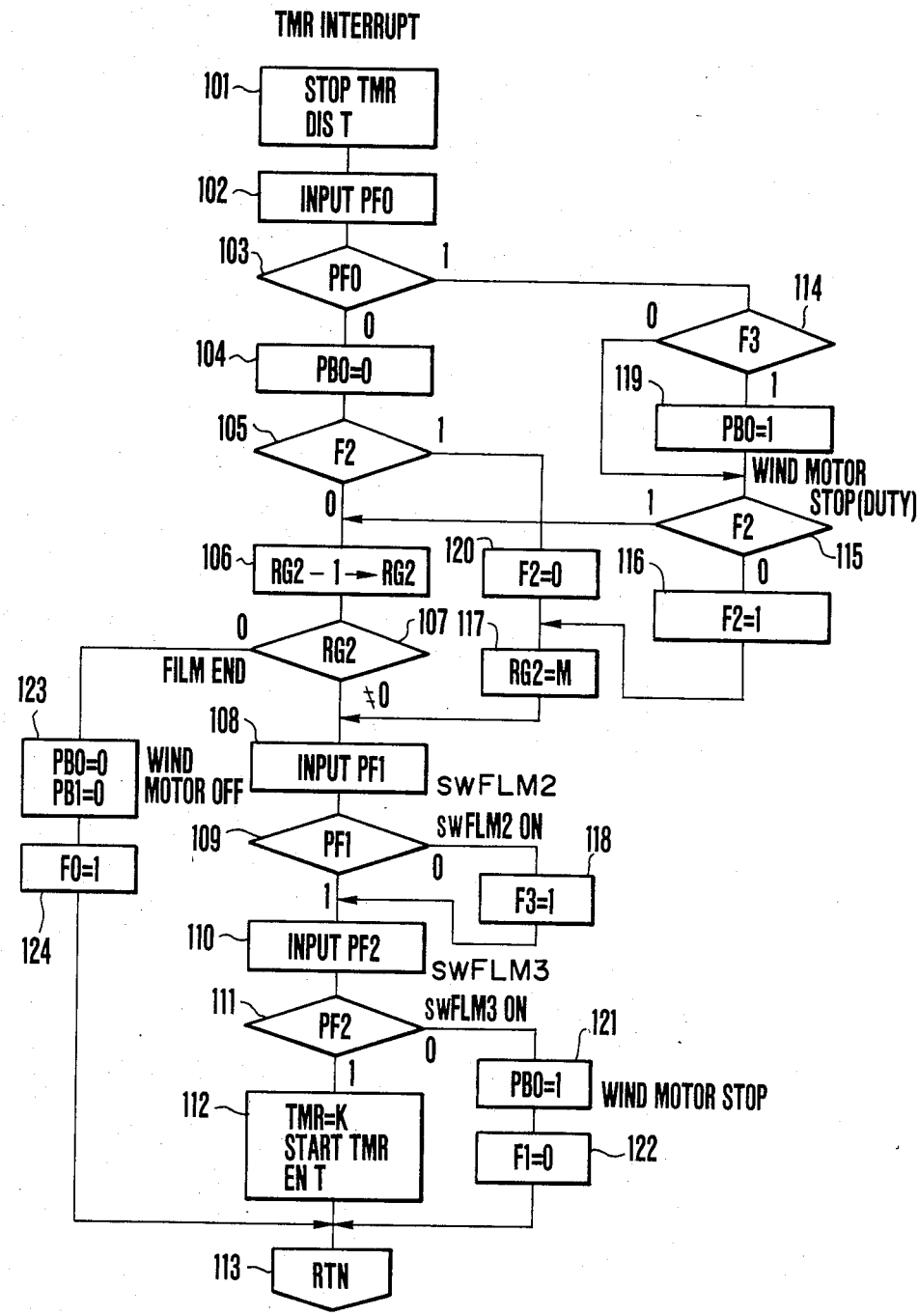

For note, in the continuous shooting mode, the braking of the motor M2 by short-circuiting both ends of winding thereof in step 121 of FIG. 22 is maintained until the termination of the next exposure, thereby giving an advantage that the film is held stationary against the tension of the film by its elasticity and the twisting of the gear shafts. So, the image on the film cannot be blurred.

Step 6: The APEX value Tv of shutter time in the form of a 4-bit digital value from the A/D converter ADC is introduced. Since the number of bits is four, the possible decimal numbers are "0" through "15".

Step 7: Since the PG inputs of step 6 are stored in an accumulator A, this value is transferred to an internal register RG1.

Step 8: The PE0 output is changed to "1", causing the transistor TR2 turn on so that the capacitor C0 which has so far been charged to almost equal a voltage to the battery voltage Vcc is suddenly discharged to the first latch control solenoid MG0. Thereby, a mechanical release is actuated.

Step 9: The flow is waited for a certain time by a timer. A program for this purpose is, for example, to put a certain value into the accumulator A, and then subtract one by one from that value until A=0. The time necessary to do this may be used as the wating time. The program procedure is not shown because the flow chart would become very complicated. For note, TIME2 to TIME4 have similar programs.

Step 10: The PE0 output is then changed to "0", thereby the current supply to the first latch control solenoid MG0 is cut off. TIME1 may be determined to be slightly longer than the minimum time for which the first latch control solenoid MG0 is energized. After that, the mechanical sequence of operation goes on so that the diaphragm is closed down to the presetting, and the mirror is moved upward.

Step 11: The PA1 input representing the movement of the mirror is taken up. In a certain time from the release of the mirror from the latching connection by MG0, the mirror should reach the terminal end of movement.

Step 12: A routine for waiting the mirror until it reaches the non-viewing position. When this position is reached, step 13 is executed. This routine is provided for ascertaining that the mirror is moved away completely from the light path to the exposure aperture, before the shutter is opened.

Step 13: The flag F0 is examined. F0=1 represents the film end.

Step 14: The flag F1 is examined. F1=0 represents the termination of each cycle of film winding operation.

Step 15 : Whether or not the value of the internal register RG1 is "0" is examined. As has been described above, when the computed shutter time is shorter than 1/1000 sec., the PG inputs take "0000", or RG1=1.

Step 16: If RG1=0, it is forced to RG1, or the shutter time is fixed to 1/1000 sec.

Step 17: Whether or not RG1>8, or the shutter time is longer than ⅛ sec. is examined.

Step 18: If RG1>8, it is forced to RG1=8, or the shutter time is fixed to ⅛ sec.

Step 19: The accumulator A is incremented by "1". Routines in steps 19 to 22 are to convert the value of the internal register RG1 representing the sutter time to elongate as multiplied by 2 in sequence.

Step 20: "1" is subtracted from the value of the internal register RG1, and then put again into it.

Step 21: Whether or not RG1=0 is examined. If it is "0", jump to step 23. If not, advance to step 22.

Step 22: The content of the accumulator A is shifted to the left, or doubled. On assumption that the accumulator A has 8 bits, then when, for example, RG1=8, the content of the accumulator A is shifted 7 times. Since the initial content of the accumulator A was [00000001], it, therefore, becomes [10000000].

Step 23: The content of the accumulator A is transferred to the internal register RG1. Thus, the shutter time is elongated in multiplied-by-2 serial fashion.

Step 24: The PE1 output is changed to "1", causing the leading curtain control solenoid MG1 to be supplied with current. The leading curtain starts running.

Step 25: A waiting time is formed by a constant time timer.

Step 26: The content of the internal register RG1 is reduced by "1".

Step 27: The steps 25 to 27 are repeated until the content of the internal register RG1 becomes "0". In this step, an actual time of the shutter time is counted.

Step 28: The PE2 output is changed to "1", causing the trailing curtain control solenoid MG2 to be supplied with current. The trailing curtain runs down, terminating the operation of the focal plane shutter.

Step 29: A time necessary for the trailing curtain to travel across the film gate is formed by a constant time timer.

Step 30: Reset to PE1=PE2=0. So the leading and trailing curtain control solenoids MG1 and MG2 are deenergized.

Step 31: An input from the trailing curtain sensor switch swCN2 is taken up.

Step 32: A routine for waiting swCN2 to open or waiting up for the completion of the running down of the trailing curtain. When it has run down, advance to step 33.

Step 33: PD0=1, PD1=1 render the drive circuit DR1 operative. The charge motor M1 starts to rotate. Thereby, the shutter, mirror and automatic diaphragm are charged.

Step 34: Wait for a time from the start of current supply to the motor M1 to start energization of te wind-up motor M2, until the current flowing through the winding of the motor M1 becomes stable. Thereby, the rush currents in the initial stages of operation of the motors M1 and M2 are prevented from superimposing one upon another.

Step 35: PB0=0, PB1=1 render the drive circuit DR2 operative. The motor M2 starts to rotate. Thereby the film is wound up.

Step 36: Set a constant K in a timer TMR for timer interruption. K is taken at a value depending on the winding-up speed of the film, the number of equally divided parts of the pulse disc P1 (FIG. 5) of the first film switch swFLM1, and the period of instruction cycle of the microcomputer COM.

Step 37: Start the timer TMR for timer interruption. Enable the timer interruption (EN T). Input a constant M into the internal register RG2. Set the flags F0=F2=F3=0, F1=1. The flag F2 represents the ON or OFF state of the first film switch swFLM1, and the flag F3 represents the ON or OFF state of the second film switch swFLM2. The timer TMR since started is decremented repeatedly independently of the main program routine. For every prescribed time (dependent on the constant K), interruption is effected with jump from the executed program to a specific timer interruption address. Here, the timer interruption procedure is explained by reference to FIG. 22.

Timer Interruption Procedure:

Step 101: Prohibit decrement and interruption of timer TMR.

Step 102: Input PF0 from the first film switch swFLM1.

Step 103: If PF0=0, advance to step 104. If PF0=1, jump to setp 114.

Step 104: Because PB0 remains the same as that set in step 35, the current supply to the wind-up motor continues.

Step 105: Test flag F2. Because F2 has been set in step 37, advance to step 106.

Step 106: Decrease the content of the internal register RG2 by "1".

Step 107: Test RG2=0. Since, in the up-to-present program, RG2=M−1, for, as M is somewhat large a value, it does not become "0", advance to step 108.

Step 108: Input PF1 from the second film switch swFLM2.

Step 109: Test PF1=0. If the film is not being advanced just before the terminal end of length of one frame yet, PF1=1. So, advance to step 110.

Step 110: Input PF2 from 3rd film switch swFLM3.

Step 111: Test PF2=0. If the cycle of film winding operation is not completed yet, PF2=1. So advance to step 112.

Step 112: Set the constant K in the timer register again, causing the timer TMR to start so that interruption is enabled.

Step 113: Return to the original program under execution. The timer interruption subroutine is to turn away from the program under execution to going for testing the states of the three film switches swFLM1, swFLM2 and swFLM3 in every certain time. Since the program itself goes with the instructions each of which is executed at a very high speed, the recycling of the input of film winding up information in the certain period does not actually give rise to a problem.

Now assuming that a certain cycle of execution of the timer interruption subroutine is encountered with opening of the first film switch swFLM1, then jump from step 103 to step 114.

Step 114: Test flag F3=1. Since F3=0 has been set in step 37, advance to step 115.

Step 115: Test flag F2=1. Since F2=0 has been set in step 37, advance to step 116.

Step 116: Set flag F2 to "1". This means that the first film switch swFLM1 has turned off, in other words, the input PF0 has changed to 1.

Step 117: Set again the internal register RG2 to the constant M. Then, jump to beginning of the aforesaid subroutine with step 108. Here, for a little while, the winding-up is carried out. Suppose a moment just before the terminal end of one-frame movement of the film. Since, at this time, the second film switch swFLM2 turns on, PF1=0 appears, causing step 109 to be followed by step 118.

Step 118: Set flag F3 to "1". In the subsequent cycle of execution of the timer interruption subroutine, therefore, a jump to step 119 occurs at step 114.

Step 119: Set PB0=1. Since PB1=1 has been set in step 37, the wind-up motor M2 is deenergized, and, at the same time, braked. But inertia does not allow the motor M2 to stop immediately. So it continues rotating. By the subsequent cycle of execution of the timer interruption subroutine, as the first film switch swFLM1 changes from OFF to ON, step 103 is followed not by step 114, but by step 104. Since PB0=0 takes place again, the motor M2 is energized for the second time. Since, at this time, F2=1 as has already been set in step 116, advance to step 120.

Step 120: Set flag F2 to "0", and then jump back to step 117 where the constant M is set in the internal register RG2. In conclusion, after the second film switch swFLM2 turns on, that is, the winding up nears completion, as the ON-and-OFF operation of the first film switch swFLM1 recycles, the motor M2 is put under duty control to repeat driving-braking-driving-braking and so on. Thus, it is being decelerated.

When the cycle of film winding operation has completed, the third film switch swFLM3 is turned on. So, a jump from step 111 to step 121 takes place.

Step 121: Brake the motor M2 as in step 119.

Step 122: Set flag F1 to 0, which represents the termination of the film winding operation. Then, jump back to step 113 where the subroutine transits to the original program. Because step 112 is not in the path, no more interruption occurs.

Next assuming that the used film is of 24-exposure length, and the 24th frame has just been exposed, then energization of the motor M2 will only result in tension of the film. So, the first film switch swFLM1 can no longer turn on and off, causing the flag F2 to be left unchanged from "0" or "1". In step 106, therefore, the content of the internal register RG2 is subtracted by 1 in each cycle of execution of the timer interruption subroutine. When RG2=0 is reached in some cycle number, a jump from step 107 to step 123 takes place. Step 123: Set PB0=PB1=0, causing both ends of the winding of the motor M2 to open.

Step 124: Set flag F0=0, which represents the film end.

The above-described loop beginning with the step 37 of the main routine is executed always until the next shot goes to step 15. Thus, the film winding operation is controlled accurately.

We now proceed to explain the remain of the main program routine.

Step 38: Input a signal representing that the shutter, mirror and automatic diaphragm have been charged from the charge switch swCGE.

Step 39: A routine comprised together with step 38 for waiting until the charging is completed. Of course, during this time, a necessary number of cycles of timer interruption procedure are carried out.

Step 40: Change PD0 output to 1, causing the charge motor M1 to be braked.

Step 41: Test flag F0 representing the film end. Now, if the film is not in the end, advance to step 41'.

Step 41': If the film is not in the end yet, taking it as the completion of the film winding-up, set the flag F4 to "1".

Step 42: Similar to step 2.

Step 43: If the photographer has set the continuous shooting mode by turning on the switch swCS and continues pushing down the release button to the second stroke, as the switch sw2 also continues ON, it is when the charging is completed that the PA input becomes [00H]in the hexadecimal number system, causing jump to step 5-1: NEXT. Step 5-1 is followed by step 6 as the photographic sequence goes on, as has been described above. It should be pointed out here that the short-circuiting of the wind-up motor M2 is not released even after the completion of the film winding-up. Therefore, as has been described above, there is no possibility of blurring the image as the film is slightly moved when the short-circuiting of the motor M2 is released during the exposure of the film.

While leaving the mode selector switch swCS in ON state for continuous shooting, the photographer changes his intention to make only one shot. In this case, after the shot, the photographer no longer pushes down the release button to the second stroke. So, step 43 is followed by step 44.

On the other hand, if the photographer turns off the switch swCS to set the single frame shooting mode in the camera, it will results that even when he continues pushing down the release button to the second stroke with the closure of the switch sw2, the completion of the charging causes the flow to return from step 43 to step 5-1 and then to be branched therefrom to step 5-3 followed by steps 5-4 to 5-8. Therefore, as has been described above, the motor M2 is braked for the prescribed time, and then both ends of winding of the motor M2 are opened. Then, the battery latching is released through step 4-2.

Step 44: Recycle the steps 41 to 44 until the completion of the winding-up is determined by the timer interruption procedure, or until F1=0 is reached. Upon completion of the winding-up, return to step 1: START. In step 4, the latching of the battery voltage Vcc is then released. If the first stroke dependent switch sw1 also is OFF, the battery voltage Vcc disappears. (The photographing sequence comes to end.)

Rewind Procedure

When the film comes to end at an intermediate point during the winding operation, flag F0=1 is resulted by the timer interruption procedure, the flow is branched from step 41 to step 45.

Steps 45 to 47: Similarly to steps 28 to 30, the trailing curtain control solenoid is supplied with current for a prescribed time, thereby the trailing curtain is run down. Therefore, even if the photographer carelessly detaches the lens from the camera body and exposes the shutter curtain to intense light, the film being rewound is prevented from being fogged during the rewinding operation. Also because both of the leading and trailing curtains exist over the exposure aperture, even if the shutter curtains are deformed by the action of static electricity and wind pressure causes to occur when the film is being transported, light leak to the surface of film can be completely shut off.

Step 48: Input a signal from the trailing curtain sensing switch swCN2.

Step 49: Wait for the completion of running down of the trailing curtain. Upon completion, then advance to step 50.

Step 50: Set PC0=0, PC1=1, causing the rewind motor M3 to rotate.

Step 51: Set the internal register RG2 to M1.

Steps 52–60: Determine when the film leader comes across the drive sprocket 29a. This program for detecting the stoppage of the sprocket 29a from further rotation is similar to the film motion detecting program described in connection with the steps 102, 103, 105, 106, 107, 115, 116, 117 and 120 of the timer interruption procedure. Upon completion of the rewinding, then advance to step 61.

Step 61: Change to PC0=1, causing the rewind motor M3 to stop.

Step 62: Reset flag F0 to "0" which represents the film end.

Step 63: Change to PD0=0, PD1=1, causing the charge motor M1 to rotate. That is, because the trailing curtain of the shutter was allowed to run down before the rewinding, the re-charging is carried out to set the shutter in the normal state by this step.

Step 64: Input a signal from the charge switch swCGE.

Step 65: Wait for the completion of the charging before an advance to step 66.

Step 66: Stop the motor M1. Thus, the rewind procedure all comes to end. Exit this subroutine.

In connection with the continuous shooting mode, we should consider a particular situation where the charging of the shutter, the mirror and the automatic diaphragm terminates so far earlier than the termination of the film winding operation that after the first latch control solenoid MG0 has been energized to actuate the next camera release, the film is tensioned, as the film end comes up.

In this situation, though the diaphragm has been closed down and the mirror has been moved upward in response to energization of the solenoid MG0, the film gets stopped from further movement to the length of one frame so that the third film switch swFLM3 remains OFF. If the camera is made automatically switched to the rewind mode even under such conditions, the photographer would mistake the execution of the rewinding operation as that the shutter has opened and closed. So he would later have an erroneous management. Also, because the mirror is held in the non-viewing position, when the lens is pointed toward a very intense light source, the film will be fogged. For this reason, it is recommended to set the mirror down before the film is rewound.

Upon detection of the film end in the timer interruption procedure at a time after the mirror-up has been determined in step 12 and when the completion of the winding is waited in steps 13 and 14, for the flag F0 is set to "1" in step 124, the flow is branched at step 13 to step 67.

Step 67: Change to PD0=0, PD1=1, causing the motor M1 to rotate.

Steps 68–69: Detect the charge end.

Step 70: Change to PD=1, causing the charge motor M1 to be braked. Because in this state, the charging is completed, as the mirror moves down with charging, the initial position is regained. Next, jump to step 45: RWND where the rewind procedure is executed.

Though the foregoing embodiments of the invention have been described in connection with the braking method of the wind-up motor that, as the film is being wound up, when the fact that the advanced amount of film is slightly shorter than the length of exactly one frame is detected, the driving current of the motor M2 is interrupted repeatedly, or the so-called duty control is carried out, to decelerate the speed of the motor M2, and then when the film has been advanced through the length of one frame, the ends of winding of the motor M2 are short-circuited to brake the motor M2, whereby when in the continuous shooting mode, the short-circuiting of the motor M2 is not released, while when in the single frame shooting mode, the short-circuiting of the motor M2 is released after the prescribed time, it is to be understood that the present invention is not confined to such a braking method of the motor M2. That is, the present invention is applicable to a motorized camera in which when the film has advanced through the length of one frame, the motor M2 is supplied with reverse current, thereby the motor M2 is rapidly stopped.

As has been described above, according to the fourth embodiment, the braking method of the wind-up motor is changed over between the single frame shooting mode and the continuous shooting mode, thereby giving advantages that the film frame being exposed is prevented from vibrating, the consumption of electrical power necessary to brake the motor is minimized, and further that the spaces between the successive two frames can be maintained equal to each other.

What is claimed is:

1. A drive device for a camera having a plurality of motors alloted to charging of the various portions of the camera and film transportation, comprising:
    (a) shutter operating means;
    (b) detecting means for detecting completion of a shutter operation by said shutter operating means; and
    (c) control means for controlling said plurality of motors to become operative almost simultaneously when the completion of the shutter operation is detected by said detecting means, said control means controlling the operation in such a manner that the operations of said motors are started in slightly displaced timing relation so that their rush currents are prevented from superimposing one upon another.

2. A device according to claim 1, wherein one of said motors carries out shutter charging, and another one carries out winding up of film.

3. A drive device for a camera comprising:
    (a) shutter operating means;
    (b) detecting means for detecting completion of a shutter operation by said shutter operating means;
    (c) a first motor;
    (d) film winding-up means for driving the film to be wound up by said first motor as a drive source;
    (e) a second motor;
    (f) shutter charging means for charging said shutter operating means by said second motor as a drive source; and
    (g) control means for controlling said first and said second motors to become operative almost simultaneously when the completion of the shutter operation is detected by said detecting means, said control means causing said second motor to initiate its operation first and then, in a slight delay, said first motor to initiate its operation, thereby the rush current at the time of the initiation of the operation of said second motor and the rush current at the time of the initiation of the operation of said first motor are displaced with each other.

4. A device according to claim 3, wherein said control means includes a microcomputer.

5. A device according to claim 3, further comprising:
(a) diaphragm operating means;
(b) mirror operating means;
(c) diaphragm charging means for charging said diaphragm operating means by said second motor as a drive source; and
(d) mirror charging means for charging said mirror operating means by said second motor as a drive source.

6. A device according to claim 3, further comprising:
(a) a third motor; and
(b) film rewinding means for driving the rewinding of the film by said third motor as a drive source.

7. A drive device for a camera having a wind-up motor for carrying out winding up of film and a charge motor for carrying out charging of the various portions of the camera, comprising:
(a) cartridge detecting means for detecting whether or not the camera is loaded with a film cartridge;
(b) shutter operating means;
(c) shutter detecting means for detecting the completion of a shutter operation by said shutter operating means; and
(d) control means for controlling the initiation of operation of said motors when the completion of the shutter operation is detected by said shutter detecting means, whereby when the load of the film cartridge in the camera is detected by said cartridge detecting means, said control means causes both of said wind-up motor and said charge motor to initiate their operations, while when no load of the film cartridge is detected by said cartridge detecting means, said control means causes only said charge motor to initiate its operation, and prevents the initiation of the operation of said wind-up motor.

8. A drive device for a camera comprising:
(a) cartridge detecting means for detecting whether or not the camera is loaded with a film cartridge;
(b) shutter operating means;
(c) shutter detecting means for detecting the completion of a shutter operation by said shutter operating means;
(d) a motor for winding up;
(e) film winding-up means for driving the winding-up of film by said motor for winding up as a drive source;
(f) a motor for charging;
(g) shutter charging means for charging said shutter operating means by said motor for charging as a drive source; and
(h) control means for controlling the initiation of operation of said motor for winding up and said motor for charging when the completion of a shutter operation is detected by said shutter detecting means, whereby when the load of the film cartridge in the camera is detected by said cartridge detecting means, said control means causes both of said motor for winding up and said motor for charging to initiate their operations, while when no load of the film cartridge is detected by said cartridge detecting-means, said control means causes only said motor for charging to initiate its operation, and prevents the initiation of the operation of said motor for winding up.

9. A device according to claim 8, wherein said control means includes a microcomputer.

10. A device according to claim 8, further comprising:
(a) diaphragm operating means;
(b) mirror operating means;
(c) diaphragm charging means for charging said diaphragm operating means by said motor for charging as a drive source; and
(d) mirror charging means for charging said mirror operating means by said motor for charging as a drive source.

11. A device according to claim 8, further comprising:
(a) a third motor; and
(b) film rewinding means for driving the rewinding of the film by said third motor as a drive cource.

12. A drive device for a camera having a wind-up motor for carrying out winding-up of film and a charge motor for carrying out charging of the various portions of the camera, comprising:
(a) cartridge detecting means for detecting whether or not the camera is loaded with a film cartridge;
(b) shutter operating means;
(c) shutter detecting means for detecting the completion of a shutter operation by said shutter operating means;
(d) wind-up detecting means for detecting completion of wind-up of a prescribed amount of film by the drive of said wind-up motor;
(e) charge detecting means for detecting completion of charge by the drive of said charge motor; and
(f) control means for controlling the operations of said motors when the completion of the shutter operation is detected by said shutter detecting means, whereby
(f-1) when the load of the film cartridge in the camera is detected by said cartridge detecting means, said control means causes both of said wind-up motor and said charge motor to initiate their operations and allows the operation of said wind-up motor to continue until the completion of the prescribed amount of winding up is detected by said wind-up detecting means, and the operation of the charge motor to continue until the completion of the charging is detected by said charge detecting means; and
(f-2) when no load of the film cartridge is detected by said cartridge detecting means, said control means causes both of said wind-up motor and said charge motor to initiate their operations, allows the operation of said charge motor to continue until the completion of the charging is detected by said charge detecting means, and forcibly prevents continuation of the operation of said wind-up motor before the completion of the prescribed amount of winding up is detected by said wind-up detecting means.

13. A device according to claim 12, wherein when no load of the film cartridge is detected by said cartridge detecting means, said control means allows said wind-up motor to operate only during the time when said charge motor is operating.

14. A drive device for a camera comprising:
(a) cartridge detecting means for detecting whether or not the camera is loaded with a film cartridge;
(b) shutter operating means;
(c) shutter detecting means for detecting the completion of a shutter operation by said shutter operating means;

(d) a motor for winding up;
(e) film winding-up means for driving the winding-up of film by said motor for winding up as a drive source;
(f) a motor for charging;
(g) shutter charging means for charging said shutter operating means by said motor for charging as a drive source;
(h) wind-up detecting mean for detecting completion of wind-up of a prescribed amount of film by the drive of said wind-up motor;
(i) charge detecting means for detecting completion of charge by the drive of said charge motor; and
(j) control means for controlling the operation of said motors when the completion of the shutter operation is detected by said shutter detecting means, whereby
(j-1) when the load of the film cartridge in the camera is detected by said cartridge detecting means, said control means cause both of said wind-up motor and said charge motor to initiate their operations, and allows the operation of said wind-up motor to continue until the completion of the prescribed amount of winding up is detected by said wind-up detecting means, and the operation of said charge motor to continue until the completion of the charging is detected by said charge detecting means; and
(j-2) when no load of the film cartridge in the camera is detected by said cartridge detecting means, said control means causes both of said wind-up motor and said charge motor to initiate their operations, allows the operation of said charge motor to continue until the completion of charging is detected by said charge detecting means, and forcibly prevents the continuation of the operation of said wind-up motor before the completion of the prescribed amount of winding up is detected by said wind-up detecting means.

15. A device according to claim 14, wherein when no load of the film cartridge is detected by said cartridge detecting means, said control means allows said wind-up motor to operate only during the time when said charge motor is operating.

16. A device according to claim 14, wherein said control means includes a microcomputer.

17. A device according to claim 14, further comprising:
(a) diaphragm operating means;
(b) mirror operating means;
(c) diaphragm charging means for charging said diaphragm operating means by said motor for charging as a drive source; and
(d) mirror charging means for charging said mirror operating means by said motor for charging as a drive source.

18. A device according to claim 14, further comprising:
(a) a third motor; and
(b) film rewinding means for driving the rewinding of the film by said third motor as a drive source.

19. A camera capable of selecting a single frame shooting mode and a continuous shooting mode comprising:
(a) a motor for winding up;
(b) a winding up transmission system for driving winding up of film by said motor for winding up as a drive source;
(c) wind-up detecting means for detecting that the film winding by said winding up transmission system has reached a prescribed amount;
(d) selecting means for selecting either one of said single frame shooting mode and said continuous shooting mode;
(e) film exposure operating means; and
(f) control means for controlling the operation of said motor for winding up, whereby
(f-1) when said single frame shooting mode is selected by said selecting means, said control means brakes said motor for winding up for a prescribed time after the attainment of the film winding to a prescribed amount is detected by said wind-up detecting means; and
(f-2) when said continuous shooting mode is selected by said selecting means, said control means causes braking of said motor for winding up to be initiated after the attainment of winding up of film to a prescribed amount is detected by said wind-up detecting means, and said braking to continue at least until the next frame of film is exposed by the operation of said film exposure operating means.

20. A camera according to claim 19, wherein when said continuous shooting mode is selected, said control means causes said braking to continue during the time when the next frame of film is being exposed by the operation of said film exposure operating means.

21. A camera according to claim 19, wherein said braking of said motor for winding up by said control means is carried out by short-circuiting both ends of winding of said motor.

22. A camera according to claim 19, wherein said control means includes a microcomputer.

* * * * *